(12) United States Patent
Lee et al.

(10) Patent No.: US 9,128,288 B2
(45) Date of Patent: Sep. 8, 2015

(54) LIGHT-CONTROLLING DEVICE AND METHOD OF MANUFACTURING THE SAME

(71) Applicant: LG Display Co., Ltd., Seoul (KR)

(72) Inventors: Moon Sun Lee, Sejong (KR); HyunJin An, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/100,674

(22) Filed: Dec. 9, 2013

(65) Prior Publication Data

US 2014/0177025 A1    Jun. 26, 2014

(30) Foreign Application Priority Data

Dec. 12, 2012   (KR) .................. 10-2012-0144932

(51) Int. Cl.
  *G02B 26/00*   (2006.01)
  *G02B 26/02*   (2006.01)

(52) U.S. Cl.
  CPC .................................... *G02B 26/026* (2013.01)

(58) Field of Classification Search
  CPC ...... G02B 26/00; G02F 1/167; G02F 2202/36
  USPC .................................................. 359/290–297
  See application file for complete search history.

(56) References Cited

U.S. PATENT DOCUMENTS

| 7,495,821 B2 * | 2/2009 | Yamakita et al. ............. 359/296 |
| 2007/0211330 A1 | 9/2007 | Ohshima et al. |
| 2010/0085628 A1 * | 4/2010 | Lee ............................... 359/296 |
| 2012/0154898 A1 | 6/2012 | Kwon et al. |

FOREIGN PATENT DOCUMENTS

| JP | 05-33404 U | 4/1993 |
| JP | 06-041222 Y2 | 10/1994 |
| KR | 10-2012-0057727 A | 6/2012 |

OTHER PUBLICATIONS

International Search Report.
English Translation of KR 10-2012-0057727 A.
English Translation of JP 05-033404 U.
English Translation of JP 06-041222 Y2.

* cited by examiner

*Primary Examiner* — Mahidere Sahle
(74) *Attorney, Agent, or Firm* — Novak Druce Connolly Bove & Quigg LLP

(57) ABSTRACT

A light-controlling device is provided. The light-controlling device includes a first substrate, a second substrate disposed opposite the first substrate, and a partition wall separating the first and second substrates to define a cell. An optical medium containing charged particles is disposed within the cell between the first and second substrates. A plurality of first electrodes is disposed on the first substrate, and a plurality of second electrodes is disposed on the second substrate to generate electrical field within the cell to move at least some of the charged particles. Each of the first electrodes has a first width and a first thickness, and each of the second electrodes has a second width and a second thickness. Each of the second electrodes is disposed at an interval of a third width such that the open region on the second substrate between the second electrodes corresponds to the first electrode on the first substrate.

20 Claims, 13 Drawing Sheets

LIGHT-CONTROLLING DEVICE AND METHOD OF MANUFACTURING THE SAME

CROSS-REFERENCE TO RELATED APPLICATION

This application claims priority to and the benefit of Korean Patent Application No. 2012-0144932, filed on Dec. 12, 2012, the disclosure of which is incorporated herein by reference in its entirety.

BACKGROUND

1. Field of the Invention

The present invention relates to a light-controlling device, and more particularly, to a light-controlling device with increased light transmittance and shielding rate, and method of increasing the light transmittance and shielding rate in such a light-controlling device.

2. Discussion of Related Art

Research has been conducted on a light-controlling device that may be applied to windows, automobiles, airplanes, optical devices, or image display devices to control light transmittance or reflectance. The light-controlling device may block, reflect, scatter, or transmit light in an ultraviolet (UV) region, a visible light region, or a near-infrared (NIR) region due to the characteristics and movements of various kinds of charged elements.

When the light-controlling device is applied to, or otherwise used as, windows of buildings or automobiles, the light-controlling device can control the transparency of the window to adjust the amount of light entering through the window. For example, the light-controlling device can be used to adjust the sunlight entering through the window to control the indoor temperature and brightness, and provide energy efficient environment.

For most applications, both light transmittance rate and light shielding rate are important aspects of the light-controlling device. These properties, however, generally have a trade-off relationship with each other, and therefore it is often difficult to achieve both the high light transmittance and the high shielding rates at the same time. Attempts have been made by using polymer disperse liquid crystal (PDLC) having a varied light intensity, but it still lacks sufficient light transmittance and/or light shielding properties in many applications.

Accordingly, there is still a need for a light-controlling device capable of providing both high transmittance and a high shielding rate.

SUMMARY OF THE INVENTION

In an aspect, the present disclosure is related to an improved light-controlling. The light-controlling device includes a first substrate and a second substrate. The light-controlling device also includes a partition wall separating the first and second substrates to define a cell. Within the cell, an optical medium, which contains charged particles, is disposed therein. The light-controlling device further includes a plurality of first electrodes and a plurality of second electrodes for generating electrical field to move at least some of the charged particles within the cell. Each of the first electrodes has a first width and a first thickness, and is disposed on the first substrate within the cell. Each of the second electrodes has a second width and a second thickness, and is disposed on the second substrate within the cell. Each second electrode on the second substrate is disposed at an interval of a third width (i.e., distance between the two adjacent edges of the adjacent second electrodes). During the operation of light-controlling device, the electric field between the spreading electrodes and the collecting electrode is normalized due to the relative position of the open region and the collecting electrodes. Accordingly, the charged particles can spread more evenly on the spreading electrodes without any defects (e.g., uncovered region or unevenly covered region during the shielding mode).

The size and shape of electric field between the spreading electrodes and the collecting electrode can be adjusted by controlling the distance between the two spreading electrodes in reference to the size (e.g., width) of the collecting electrode as well as the amount of charged particles used in the light-controlling device.

Accordingly, in an embodiment, the second electrodes have greater width than the first electrodes. In this case, the second electrodes may be formed of conductive transparent material. The first electrodes may be formed of conductive metal material and be less transparent than the second electrodes. The first electrodes on the first substrate and the second electrodes on the second substrate are arranged such that they are horizontally off-positioned from the electrodes on the opposing substrate. Accordingly, in some embodiments, each of the first and second electrodes has at least some portion that is not being overlapped with the electrodes disposed on the opposing substrate.

Also, in some embodiments, at least one of the first electrodes on the first substrate is positioned opposite to an open region on the second substrate that is formed by the interval between the two adjacent second electrodes. The width of open region on the second substrate may be equal to or greater than the width of first electrode on the first substrate corresponding to the respective open region on the second substrate.

In some embodiments, at least one of the first electrodes has a buckled surface with projections of a first height and recesses with a first depth so that increased number of charged particles can be adhered on the first electrode. The charged particles can have shorter diameter than the first height and the first depth to further increase the number of charged particles that can be adhered to the first electrode. For instance, each of the charged particle may have a diameter of about 5 nm to about 1 µm.

In some embodiments, the light-controlling device further includes a particle guidance member on the first substrate with opening at each of the first electrodes. The particle guidance member has a third thickness, which is greater than the first thickness of the first electrode. When the light-controlling device operates in the light transmittance mode, the particle guidance member directs, or otherwise guides, the charged particles towards the collecting electrode disposed within the hollow space. Due to the difference in the thicknesses, a hollow space is formed over the first electrode. The hollow space holds the charged particles in a limited space when the first electrode is activated to attract the charged particles. In other words, the hollow space serves as a reservoir for holding the charged particles during the light transmittance mode. Because the charged particles are stacked over within the limited width of the hollow space, more charged particles can be employed by the light-controlling device without negatively affecting the light transmittance rate.

In some embodiments, the light-controlling device further includes a third electrode and a transparent insulation layer. The third electrode may be disposed on at least one of the first and the second substrates, and the transparent insulation layer is disposed on the third electrode such that the third electrode and the plurality of the first electrodes and/or the plurality of second electrodes are insulated from one another. In such embodiments, the third electrode may be disposed continuously on the substrate within the cell without any open region, and serve as an electrode for spreading the charged particles widely within the cell. Also, the first and second electrodes may have the same width, and may be configured to receive the same applied voltage so that both the first and second electrodes can serve as the electrodes for collecting the charged particles within the cell to more narrow regions.

In an aspect, the present disclosure is related to a light-controlling device. In one embodiment, a light-controlling device includes a first substrate and a second substrate. A plurality of charged particles is interposed between the first and second substrates. On one of the first and second substrates, a spreading electrode disposed thereon. Also included in the light-controlling device are one or more collecting electrodes disposed on at least one of the first and second substrates. The collecting electrode and the spreading electrode are electrically insulated from each other. The spreading electrode and the collecting electrode may be covered with an insulation layer to prevent the plurality of charged particles from directly contacting the electrodes and lose its charged state.

In some embodiments, at least one collecting electrode is disposed on the first substrate as well as the second substrate. The collecting electrode on the first substrate and the collecting electrode on the second substrate may be positioned so that they are vertically aligned with each other.

In some embodiments, one or more collecting electrodes are disposed on the first substrate, whereas the spreading electrode is disposed on the second substrate. To effectively spread the charged particles in the light-controlling device, the area of the second substrate covered by the spreading electrode is greater than an area of the first substrate covered by the collecting electrodes. In some embodiments, the spreading electrode on the second substrate has an open region, and at least one collecting electrode on the first substrate is positioned to correspond to the open region of the spreading electrode. Further, in some embodiments, the light-controlling device includes at least one particle guidance member having one or more hollow spaces. In each of the hollow space may be arranged to contain a collecting electrode therein.

Yet another aspect of the present disclosure relates to a light-controlling device. The light-controlling device includes a first substrate, a second substrate opposing the first substrate, and a plurality of charged particles interposed between the first and second substrates. On the first substrate, a collecting electrode is disposed. On the second substrate, a plurality of spreading electrodes is disposed in such a way that each spreading electrode is separated from its adjacent spreading electrode by an open region. The collecting electrode and the spreading electrodes are positioned in such a way that the open region between the spreading electrodes on the second substrate is positioned over the collecting electrode on the first substrate. A plurality of charged particles between the first substrate and the second substrate so that the particles can be moved towards the spreading electrodes or the collecting electrode by the electric force generated from the aforementioned electrodes. Accordingly, in some embodiments, the open region between the two adjacent spreading electrodes has a width that is at least the same as the width of collecting electrode. Alternatively, in some embodiments, the width of collecting electrode is greater than the width of the open region.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
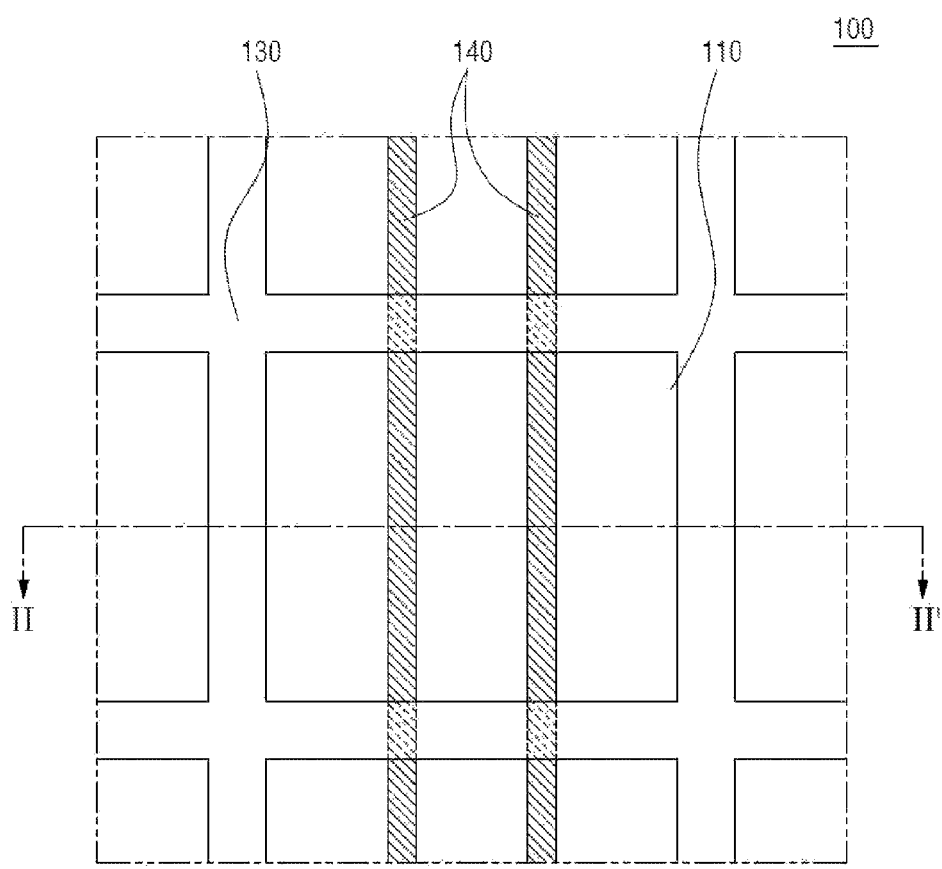
FIG. 1 is a plan view of a light-controlling device according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. It should be understood that the dimensions of the elements shown in the drawings may have been exaggerated for easier explanation of the embodiments and are not intended to limit the scope of the present invention.

An element or layer formed "on" another element or layer includes all for a case in which an element is directly formed on another element, and for a case in which an element is formed on another element with an additional element or layer formed therebetween.

Although the terms first, second, etc. may be used to describe various elements, it should be understood that these elements are not limited by these terms. These terms are only used to distinguish one element from another. For example, a first element could be termed a second element, and, similarly, a second element could be termed a first element, without departing from the scope of exemplary embodiments.

In the present specification, although disposition or formation of an element to correspond to another element or opposite the another element may refer to forming of the two elements to face each other, it should be noted that the two elements facing each other do not necessarily have identical size, shape and/or be in overlapping position in reference to each other.

In the present invention, a light-controlling device may refer to a device configured to change a light path or light characteristics, and control particles capable of changing light characteristics. For example, light incident to the light-controlling device may be transmitted through the light-controlling device, or scattered, absorbed or shielded by the light-controlling device. In the present invention, the light-controlling device may be synonymous with an active shielding layer, an electric shutter device, an active light-shielding layer, or a light-transmittance controlling device.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

FIG. 1 is a plan view of a light-controlling device 100 according to one of various exemplary embodiments in the present disclosure, and FIGS. 2 through 6, each illustrates cross-sectional view of an exemplary light-controlling device, which is taken along the line II-II' of FIG. 1. As shown in FIG. 1, a cell 110 may refer to a unit region defined by the partition wall 130 in such a way that each cell 110 is separated from other unit regions in the light-controlling device 100. Although the cell 110 is illustrated as a rectangular shape in FIG. 1, it should be appreciated that the cell 110 may be formed in various other shapes, such as a tetragonal shape, a hexagonal shape, a polygonal shape as well as a circular shape. The shape and size of the cell 110 may vary depending on the application, usage and various other design and operational factors of the light-controlling device 100.

Also, in FIG. 1, the first electrodes 140 are illustrated as extending in a single direction. However, the configuration of the first electrodes 140 are not limited as illustrated in FIG. 1. That is, the first electrodes 140 may be configured to extend in any horizontal, vertical or even diagonal directions within the cell 110. Further, the first electrodes 140 can be formed in a bent or curved line shape, or formed to have a regular/irregular patterns. Furthermore, the number of first electrodes 140 in the cell 110 is not limited to one, but each cell 110 may include as many additional first electrodes 140 to increase the efficiency in creating the necessary electric field for controlling the charged particles (which may also be referred to as charged light-controlling particles and light-controlling particles) to desired locations within the cell 110.

Figure 2:
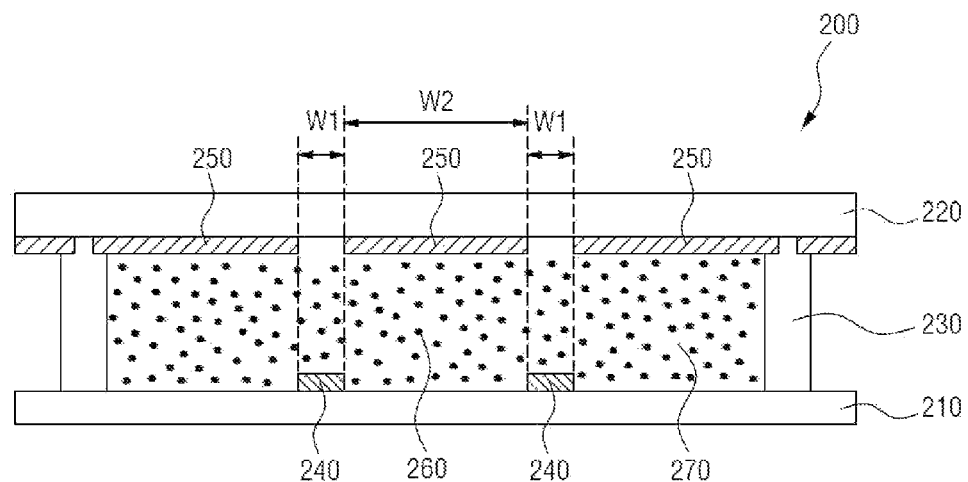
FIGS. 2 through 6 are cross-sectional views of the light-controlling device in FIG. 1, which are taken along line II-II' of FIG. 1.

Referring to FIG. 2, each cell of the light-controlling device 200 is formed between the first substrate 210, the second substrate 220, and defined by the partition walls 230. The first electrodes 240 are formed on the first substrate 210, and the second electrodes 250 are formed on the second substrate 220. Between the first substrate 210 and the second substrate 220, a plurality of charged particles 260 are placed.

The first substrate 210 and the second substrate 220, which are opposing each other, may be substrates that are configured to support several elements (not shown) of the light-controlling device 200. The first substrate 210 and the second substrate 220 may be disposed in an upper portion or lower portion of the light-controlling device 200, respectively, and they may be referred to as a support member, a support substrate, or a backplane.

When the light-controlling device 200 is used in an application requiring transmitting light through the device 200, the first substrate 210 and the second substrate 220 is formed of a light-transmissive material, such as transparent plastics, glass and the like. Also, the substrates may include various insulating materials, for example, glass, plastic and the like. In some embodiments, the first substrate 210 and the second substrate 220 may be formed with different materials depending on the required light controlling functions of the light-controlling device 200.

In some embodiments, a reflection reducing layer may be further provided on the first and second substrates 210 and 220. The reflection reducing layer may refer to a layer configured to prevent incident light from being reflected by an interface between two media having different refractive indices, and allow the incident light to be transmitted through or absorbed in the interface. The reflection reducing layer may be configured to reduce reflection of light due to a difference in refractive index between a substrate and the material adjacent to the substrate. The reflection reducing layer may include any film or layer having a refractive index between the refractive index of the substrate and a refractive index of adjacent material (e.g., the air). For example, the reflection reducing layer may include a single crystalline silicon reflection reducing layer, a polycrystalline silicon reflection reducing layer, a dielectric nano reflection reducing layer, or an anti-glare coating layer, an anti-reflection film, or a low-reflection (LR) coating layer formed of polyethylene terephthalate (PET), polymethyl methacrylate (PMMA), or polycarbonate (PC).

Further, when the light-controlling device 200 is a flexible light-controlling device, the first substrate 210 and the second substrate 220 may be formed of a flexible material. Here, not only polyimide (PI), but also polyether imide (PEI) or polyethylene terephthalate (PET) may be used as the flexible material.

The first electrodes 240 are conductive structures formed on the first substrate 210. The first electrode 240 may be referred to as a first electrode structure, a first light-controlling electrode, or a first electrode stack structure. In the present disclosure, the first electrodes 240 operate to collect the plurality of charged particles 260 in relatively narrower regions than where the second electrodes 250 reside. Accordingly, the first electrodes 240 will be referred to as collecting electrodes. The collecting electrodes 240 may be formed of a conductive material having transparent characteristic or formed of a non-transparent conductive material. For instance, the collecting electrodes 240 may be formed of a material, such as indium tin oxide (ITO), indium zinc oxide (IZO), carbon nanotubes (CNTs), graphene, or poly(3,4-ethylenedioxythiophene)poly(styrenesulfonate) (PEDOT:PSS). Also, the collecting electrodes 240 may also be formed of a metal, such as chromium (Cr), molybdenum (Mo), silver (Ag), aluminum (Al), copper (Cu), magnesium-silver (MgAg), magnesium-calcium (MgCa), aluminum-silver (AlAg), ytterbium-silver (YbAg), or nano-Ag, or a plurality of metal materials other than the above-described metal materials. The collecting electrodes 240 may be disposed on at least a portion of the first substrate 210. The collecting electrodes 240 may be patterned and formed on a partial region of the first substrate 210.

The second electrodes 250 are conductive structures formed on the second substrate 220, which may or may not be parallel to the second substrate 220. The second electrodes 250 may be referred to as a second pixel electrode. In the present disclosure, the second electrodes 250 operate to widely spread the plurality of charged particles 260 across the second electrodes 250. Accordingly, the second electrodes 250 will be referred to as spreading electrodes. The spreading electrodes 250 may be formed of a transparent conductive material or a conductive metal material. For instance, the spreading electrodes 250 may be formed of a material, such as ITO, IZO, CNTs, graphene, or PEDOT:PSS. The spreading electrodes 250 may also be formed of a metal, such as chromium, molybdenum, silver, aluminum, copper, magnesium-silver, magnesium-calcium, aluminum-silver, ytterbium-silver or nano-Ag, or a plurality of metal materials other than the above-described metal materials. The spreading electrodes 250 may be disposed on at least a portion of the second substrate 220. The spreading electrodes 250 may be patterned and formed on a partial region of the second substrate 220.

The spreading electrodes 250 may be in a voltage application state, a ground state, or a floating state. The floating state may refer to a state in which the spreading electrodes 250 are not electrically connected to other elements using, for example, lines.

The collecting electrodes 240 and spreading electrodes 250 may be disposed on the first substrate 210 and the second substrate 220, respectively, in an alternating arrangement. That is, each collecting electrode 240 and each spreading electrode 250 are formed in between electrodes on the opposing substrate such that not one of the collecting electrodes 240 and spreading electrodes 250 is completely opposite to another electrode. For instance, a collecting electrode 240 can be disposed on the first substrate 210 and a spreading electrode 250 can be disposed on the second substrate 220 to be in a position shifted (e.g., left, right) with respect to the collecting electrode 240 on the first substrate 210 such that the collecting electrodes 240 and the spreading electrodes 250 are disposed on the first and second substrates in an alternating pattern with respect to each other. The staggered arrangement, however, does not necessarily mean that each of the collecting electrodes 240 precisely corresponds to an unpatterned region (e.g., opening, open region) between two spreading electrodes 250.

While each of the collecting electrodes 240 is described as an individual element, it should be appreciated that each of the collecting electrodes 240 may be electrically connected to each other to operate as a common electrode. For example, the light controlling device 200 may include a first common electrode, which is patterned to include a slit or opening so as to form two or more collecting electrodes 240 separated by the slit or opening. Likewise, each of the spreading electrodes 250 may be electrically connected to each other to operate as a common electrode. The light controlling device 200 may include a second common electrode, which is patterned to include a slit or opening to form two or more spreading electrodes 250 spaced apart by the slit or opening therebetween.

The patterning of the collecting electrode and the spreading electrode may vary according to the position and size of the electrodes formed on the opposing substrate. For example, the spreading electrode 240 may be formed on the entire surface of the collecting electrode 240 and patterned to correspond to a region in which an opening is formed, thereby enabling staggered arrangement.

Figure 3:
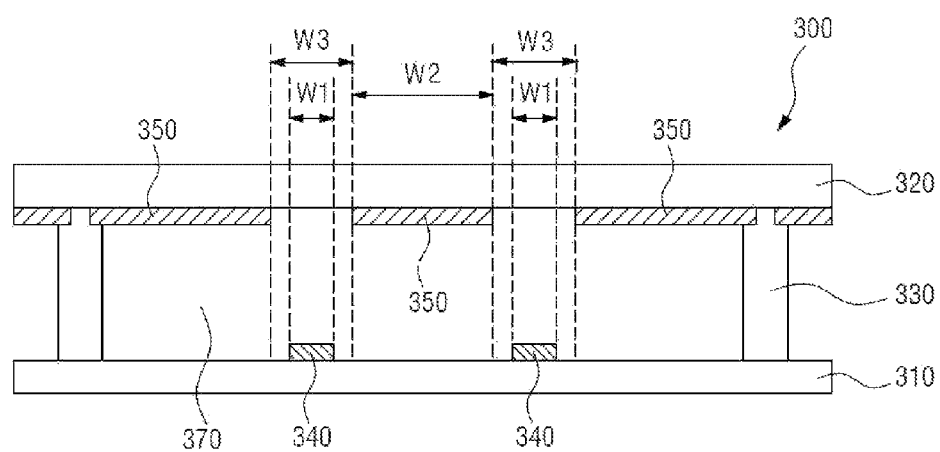

As shown in FIG. 3, the width "W1" of the collecting electrode 340 may be shorter than the width "W3" of the opening/open region between the two spreading electrodes 350 so that the collecting electrode 340 does not overlap the entire opening/open region between the two spreading electrodes 350. Further, while the collecting electrodes 340 in FIG. 3 are illustrated to be positioned at the center of the opening/open region between the spreading electrodes 350, it should be appreciated that the collecting electrodes 340 may be off-centered (i.e., shifted to one side) from the center of the opening/open region between the spreading electrodes 350.

Figure 4:
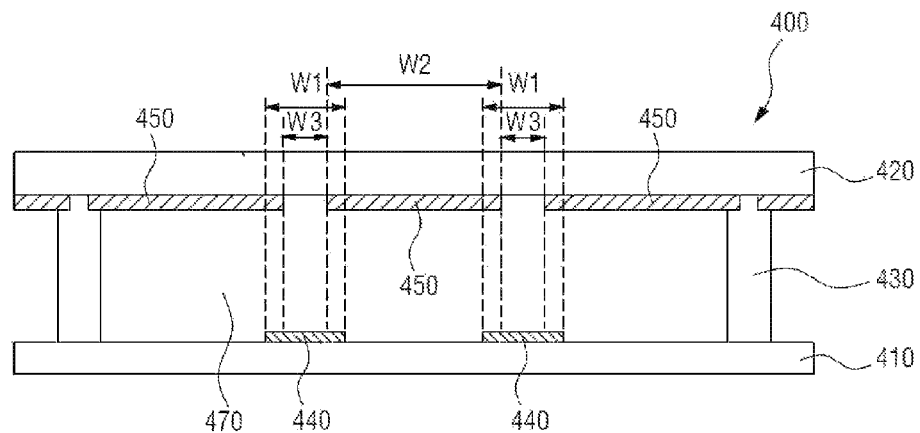

Also, as shown in FIG. 4, the width "W1" of the collecting electrodes 440 may be the same or greater than the width "W3" of the open region between the spreading electrodes 450 so that the collecting electrode 440 overlaps the entire open region between the spreading electrodes 450.

When the width "W1" of the collecting electrode 440 is greater than the width "W3" of the region between the spreading electrodes 450 as shown in FIG. 4, the collecting electrode may be offset to one side based on the center of the open region between the spreading electrodes 450

In some embodiments, the width of the collecting electrode is within a range of about ±20% of the width of the opening/open region between the two spreading electrodes.

The collecting electrode 240 may have a width or line width of about 1 μm to about 10 μm. As shown in FIG. 2, the width of the collecting electrode 240 may be the same as width W1. The width of the collecting electrode 240 may be selected not only to enable the light-controlling device 200 to control incident light, but also to satisfy sufficient transmittance. When the collecting electrode 240 has an excessively small width, a sufficient electric field may not be formed to attract the charged particles 260, and it may be difficult to drive the light-controlling device 200 due to an increase in the resistance of the collecting electrode 240 caused by a reduction in the area of the collecting electrode 240. Alternatively, when the collecting electrode 240 has an excessively great width, transmittance may be reduced.

An interval between the collecting electrodes 240 may range from about 10 μm to about 100 μm. The interval between the collecting electrodes 250 may be selected not only to control the charged particles 260 but also to satisfy sufficient transmittance and a sufficient shielding rate. When the interval between the collecting electrodes 240 is excessively small, transmittance may be degraded in a later-described transmission mode of a driving method. When the interval between the collecting electrodes 240 is excessively large, a sufficient electric field for collecting the charged particles 260 may not be formed, so that it may be difficult to control the charged particles 260.

The collecting electrode 240 may be disposed to occupy a predetermined region of the cell 110. The collecting electrode 240 may have an area corresponding to about 1 to 5% of the area of one cell 110. The area of the collecting electrode 240 may depend on the above-described width of the collecting electrode 240 and the above-described interval between the collecting electrodes 240. When the area of the collecting electrode 240 is equal to or smaller than about 1% of the area of the cell 110, it may be difficult to form a sufficient electric field for controlling the charged particles 260. When the area of the collecting electrode 240 is equal to or greater than about 5% of the area of the cell 110, it may be easy to control the charged particles 260, but light transmittance may be reduced. However, in a light-controlling device that puts driving speed before light transmittance, the collecting electrode 240 may be formed to have an area corresponding to about 30% of the area of one cell 110.

The light-controlling device 200 may include the partition wall 230 interposed between the first substrate 210 and the second substrate 220, or include isolation/division structures/elements having different shapes. The partition wall 230 may be formed as a pillar type and separate the cells 110 defined in the first and second substrates 210 and 220 from one another. That is, to separate the cells 110 defined in the first and second substrates 210 and 220 from one another, the partition wall 230 may be interposed between the separated cells 110. In some embodiments, when the cells 110 are defined adjacent to one another, the partition wall 230 may be disposed to occupy at least portions of the cells 110. By separating the cells 110 from one another using the partition wall 230, the charged particles 260 disposed in the cell 110 may be prevented from leaking into other cells due to gravity. Preventing charged particles 260 from moving from one cell to another cell maintains an equal concentration of the charged particles 260 in each cell 110. The partition wall 230 may or may not be formed in a partial region according to design specifications.

The partition wall 230 may be formed to maintain a cell interval or a cell gap. The cell interval may refer to an interval between insulating protection layers when the insulating protection layers are formed on the collecting electrode 240 and the spreading electrode 250, or an interval between the spreading electrode 250 and the first substrate 210. The partition wall 230 may be formed, for example, between the spreading electrodes 250 formed on the first substrate 210 and the second substrate 220. The maintenance of the interval between the cells 110 may significantly affect a later-described spread ratio of the charged particles 260. The charged particles 260 may maintain a uniform spread ratio due to the partition wall 230. Furthermore, the partition wall 230 may maximize transmittance of the light-controlling device 200 and be formed within such a range as not to lean the charged particles 260 toward one direction.

The partition wall 230 may be formed of a transparent material. When the partition wall 230 is formed of a transparent material, the partition wall 230 may be formed on black matrices configured to shield incident light, or include a light-shielding layer. That is, when light is incident to the light-controlling device 200, incident light may be transmitted through the partition wall 230. Accordingly, the partition wall 230 may be formed on the black matrices or include a layer configured to shield incident light, thereby increasing a shielding rate of the light-controlling device 200.

An optical medium layer 270 may be formed in a portion surrounded with the partition wall 230 between the first and second substrates 210 and 220. The optical medium layer 270 may simply be referred to as an optical medium, a charge particle medium or a shielding particle filling layer. The optical medium layer 270 may include a fluid and charged particles 260 distributed in the fluid. The fluid included in the optical medium layer 270 may be a gas solvent or a liquid solvent. The fluid may protect the charged particles 260 distributed therein from external shocks. When the fluid is a gas solvent, the mobility of the charged particles 260 may be increased to increase response speed of the light-controlling device 200. However, the gas solvent may require a high driving voltage. When the fluid is the liquid solvent, a driving voltage of the light-controlling device 200 may be lower, and positions of the charged particles 260 may be maintained according to the viscosity of the solvent even in an off state. The solvent may include a binder. Halogenated solvents, saturated hydrocarbons, silicone oils, low-molecular-weight halogen-containing polymers, epoxides, vinyl ethers, vinyl esters, aromatic hydrocarbon, toluene, naphthalene, paraffinic liquids, or poly-chlorotrifluoroethylene polymers may be used as the solvent.

The charged particles 260 distributed in the optical medium layer 270 may assume a specific color and be positively or negatively charged. The charged particles 260 may include light-reflecting particles, light scattering particles as well as light absorbing particles. The charged particles 260 may include a core material, a polymer, and a charged material. It may be determined whether the charged particles 260 are negatively charged or positively charged depending on a charge type of the charged material. The charged particles 260 may assume a white color, a black color, or a chromatic color, or be transparent particles having a high refractive index. In some embodiments, chromatic charged particles may include both white charged particles and black charged particles. FIGS. 3 and 4 illustrate the light-controlling device 200 on assumption that the light controlling particles 260 of the optical medium layer 270 are black charged particles. An example case in which the optical medium layer 270 of the light-controlling device 200 includes white charged particles or transparent charged particles having a high refractive index will be described later with reference to FIG. 11.

The charged particles 260 may have a diameter of about 5 nm to about 1 µm. When the charged 260 have a size of about 1 µm or more, light controllability of the light-controlling device 200 may be degraded during, for example, shielding or scattering of light. When the charged 260 have a size of about 5 nm or less, the charged particles 260 may agglomerate, thereby making it difficult to control the charged light-controlling particles 260. It should be appreciated that the size of the charged light-controlling particles 260 is not limited by the ranges described above. The size of the light-controlling particles 260 may be selected according to the aforementioned factors and the application of light-controlling device 200. As such, different type of the light-controlling particles 260 may have different optimal size. For example, black colored light-controlling particles (for light absorbing) may have a diameter of about 50 nm to about 500 nm.

Light absorbance of the light-controlling device 200 may depend on the concentration of charged light-controlling particles 260 distributed in the optical medium layer 270. In one cell 110, the light-controlling particles 260 may be contained at a content of about 0.1% to about 10% by weight, based on the total weight of a liquid optical medium. When the content of the light-controlling particles 260 is less than the content range, the cell 110 may have a low light absorbance, whereas when the content of the light-controlling particles 260 exceeds the content range, transmittance may be reduced. The movement of the charged light-controlling particles 260 will be described later in a method of driving the light-controlling device 200.

A protection layer (e.g., an insulation layer) may be formed on the collecting electrode 240 and the spreading electrode 250. The protection layer is configured to prevent direct contact of the charged light-controlling particles 260 and the electrodes so that the particle's charge is maintained and ensure reliability of the light-controlling device 200. The protection layer may be referred to as an insulating layer, a transmissive insulating layer, or a transparent insulating layer. The protection layer may prevent the light-controlling particles 260 carrying electric charges from reacting with the surface of the collecting electrode 240 or the spreading electrode 250, and being oxidized or reduced. Also, when the remaining current flows between the collecting electrodes 240 or the spreading electrodes 250, a voltage drop may occur during a driving operation. Thus, the insulating protection layer may prevent the voltage drop and improve power consumption, or ensure driving stability.

In the present specification, a light-controlling device may include a transparent insulation layer disposed on a collecting electrode and/or a spreading electrode. Although the transparent insulation layer is not illustrated in some of the accompanying figures, it should be appreciated that such insulation layer may be employed in the embodiments of light-controlling device described in the present disclosure.

Figure 5:
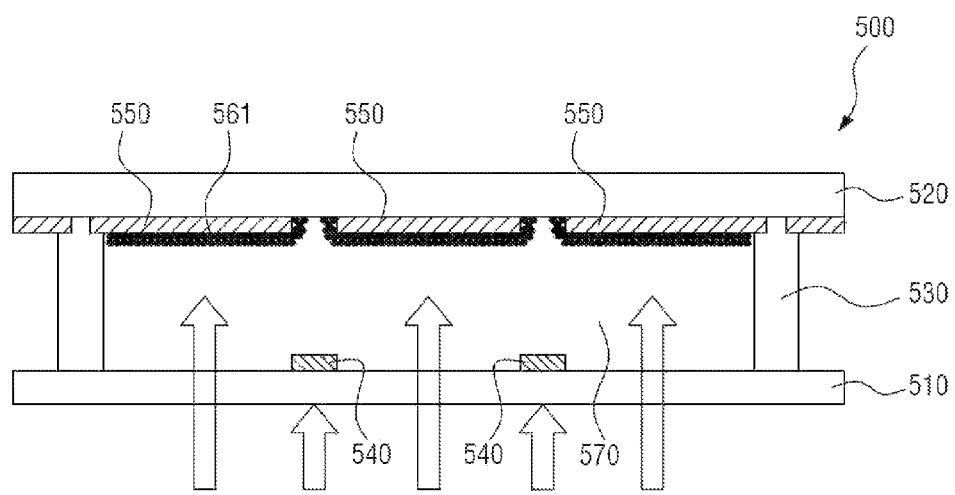
Figure 6:
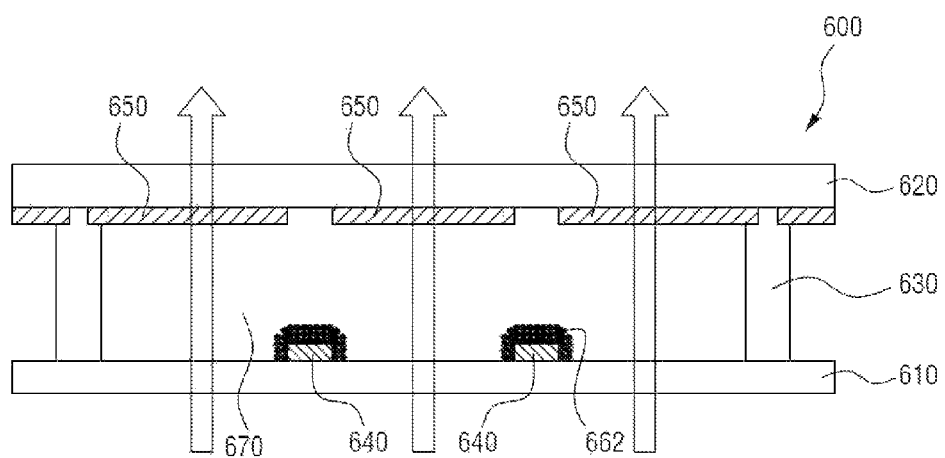

FIGS. 5 and 6 are cross-sectional views of a light-controlling device, which are taken along line II-II' of FIG. 1. Since a first substrate 510 or 610, a second substrate 520 or 620, partition walls 530 or 630, a collecting electrode 540 or 640, a spreading electrode 550 or 650, and an optical medium layer 570 or 670 are the same as the first substrate 210, the second substrate 220, the partition walls 230, the collecting electrode 240, the spreading electrode 250, and the optical medium layer 270, a repeated description thereof is omitted for brevity.

A driving operation of the light-controlling device 500 or 600 according to an exemplary embodiment of the present invention will now be described with reference to FIGS. 5 and 6. Although it is assumed for brevity that the light-controlling particles 561 or 662 distributed in the optical medium layer 570 or 670, respectively, carry negative electric charges, the charged light-controlling particles 561 or 662 may carry positive electric charges in some other embodiments Furthermore, to enable the light-controlling device 500 or 600 to operate in the transmissive mode, the first substrate 510 or 610 and the second substrate 520 or 620 may be formed of a light-transmissive material, and the spreading electrodes 550 and 650 are formed to have transparent characteristic. The collecting electrodes 540 and 640 may also be formed to have transparent characteristic. In the exemplary embodiment shown in FIGS. 5 and 6, it is assumed that the spreading electrodes 550 and 650 are formed of a light-transmissive material.

Referring to FIG. 5, a positive voltage and a negative voltage may be respectively applied to the spreading electrodes 550 and the collecting electrodes 540 to drive the light-controlling device 500. When the positive voltage is applied to the spreading electrodes 550, the light-controlling particles 561 carrying negative electric charges are moved toward the spreading electrodes 550 and distributed over the surface of the spreading electrodes 550.

FIG. 5 illustrates an example in which a positive voltage is applied to the spreading electrodes 550 formed on the second substrate 520. Also, in FIG. 5, a reference voltage or a voltage of about 0V may be applied to the spreading electrodes 550 formed on the second substrate 520, or the spreading electrodes 550 may be in a ground state.

Due to the formation of an electric field, the light-controlling-particles 561 can move toward the second substrate 520 and be disposed to cover three surfaces of each of the spreading electrodes 550. Part of light incident to the light-controlling device 500 may pass through the first substrate 510, reach the light-controlling particles 561, and be absorbed in the light-controlling particles 561. While the light-controlling particles 561 are illustrated as covering the side surfaces of the spreading electrodes 550 (i.e., side surface facing another side surface of the adjacent spreading electrode), the amount of the light-controlling particles 561 disposed in the open region between the spreading electrodes 550 can be controlled by adjusting the amount of the light-controlling particles 561 in the optical medium 570, the distance between the spreading electrodes 550 as well as the height of the spreading electrodes 550 (i.e., length of the side surface). When the light-controlling particles 561 at the side surfaces of the spreading electrodes 550 are not sufficient to completely block the open region between the spreading electrodes 550, light may leak through the open region. However, the collecting electrodes 540 disposed on the opposing substrate 510 can be made with a non-transparent material, and positioned to overlap the open region between the spreading electrodes 550 to reflect or absorb the incident light.

In FIG. 5, the light-controlling particles 561 are illustrated as being disposed on the spreading electrodes 550 in two rows for simpler illustration. However, it should be appreciated that the light-controlling particles 561 can be in many more layers to cover the spreading electrodes 550 depending on the concentration of the light-controlling particles 561 within the optical medium 570. As such, the degree of light being scattered, reflected, and/or absorbed by the charged light-controlling particles 561 may be adjusted with the concentration of the light-controlling particles 561 in each cell.

Due to the above-described arrangement of the charged light-controlling particles 561, a black color may be visible at an upper portion of the light-controlling device 500. Since light is shielded due to the above-described arrangement of the charged light controlling particles 561 with the voltage application, a current state of the light-controlling device 500 may be referred to as a shielding mode.

Although FIG. 5 illustrates light incident toward the first substrate 510, light from the second substrate 520 side can also be shielded. The light incident toward the second substrate 520 may pass through the second substrate 520 and the spreading electrode 550, then scattered, reflected and/or absorbed by the light-controlling particles 561. Although part of the light incident toward the second substrate 520 may be transmitted through the opening/open region between the spreading electrodes 550, the light may be reflected, scattered or absorbed by the collecting electrode 540 formed underneath the opening/open region if the collecting electrodes 540 are formed the appropriate materials.

FIG. 6 illustrates a state in which a positive voltage is applied to the collecting electrodes 640 formed on the first substrate 610. A reference voltage or a voltage of about 0V may be applied to the spreading electrodes 650 formed on the second substrate 620, or the spreading electrodes 650 may be in a ground state.

Due to the formation of an electric field, light-controlling particles 662 can move toward the collecting electrodes 640 formed on the first substrate 610 and be disposed around three surfaces of each of the collecting electrodes 640 of the first substrate 610.

Light incident from the first substrate 620 to the light-controlling device 600 may sequentially pass through the first substrate 610, the optical medium layer 670, and the spreading electrode 650, and pass through the light-controlling device 600. Since the incident light is transmitted through the light-controlling device 600, an object disposed on of the opposing side of the light-controlling device 600 may be visible through the light-controlling device 600. Since incident light is transmitted due to the above-described arrangement of the light-controlling particles 662 with the voltage application, a current state of the light-controlling device 600 may be referred to as a transmissive mode or transparent mode.

Although FIG. 6 illustrates only light incident toward the first substrate 610, light incident toward the second substrate 620 may be transmitted. The light incident toward the second substrate 620 may be transmitted through the second substrate 620, the spreading electrode 650, the optical medium layer 670, and the first substrate 610, and then transmitted through the light-controlling device 600. Part of the light incident toward the second substrate 620 may be reflected, scattered or absorbed by the collecting electrodes 640 formed on the first substrate 610 as well as the light-controlling particles 662 disposed around the collecting electrode 640. However, as described above with reference to FIG. 2, since the area of the collecting electrodes 640 are within about 5% of the area of the cell 110, it may not be difficult to visually recognize an object disposed on the rear surface of the light-controlling device 600. Accordingly, in the transparent mode, an object disposed on the rear surface of the light-controlling device 600 may be visible at an upper portion of the light-controlling device 600. As will be described in further detail with reference to FIGS. 8 and 9, the light being scattered, reflected or absorbed during the transmissive mode can be reduced further by adjusting the area being covered by the collecting electrodes 640 as well as the area being covered by the light-controlling particles 652 during the transmissive mode.

Although the present specification describes that the light-controlling device 500 or 600 operates in the shield mode and the transparent mode for brevity, the light-controlling device 500 or 600 may be embodied by a gray mode or opaque mode according to a voltage driving operation in addition to the transparent mode and the shielding mode.

When a voltage is applied to the collecting electrode 640 or the spreading electrode 650, an electric field may be formed around the collecting electrode 640 or the spreading electrode 650. The light-controlling particles may move based on the electric field of the collecting electrode 640 or the spreading electrode 650. Hereinafter, the formation of the electric fields of the collecting electrode 640 and the spreading electrode 650 and movement of light-controlling particles will be described.

Figure 7A:
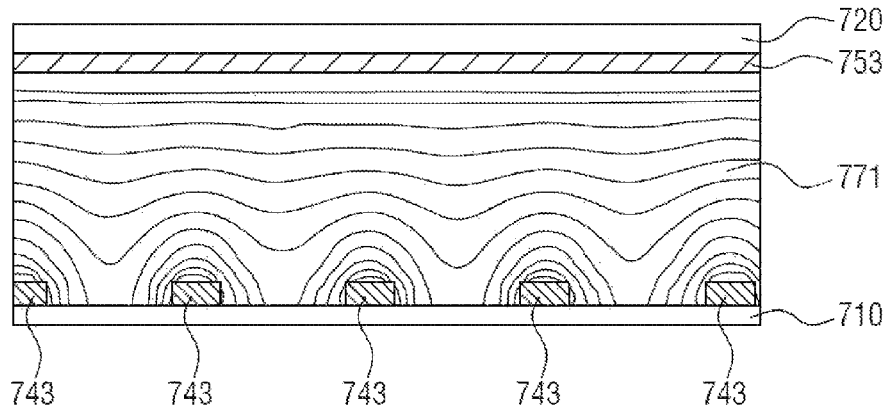
FIGS. 7A and 7B are schematic views of electric lines of force for explaining an electric field of a light-controlling device according to an exemplary embodiment of the present invention.
Figure 7B:
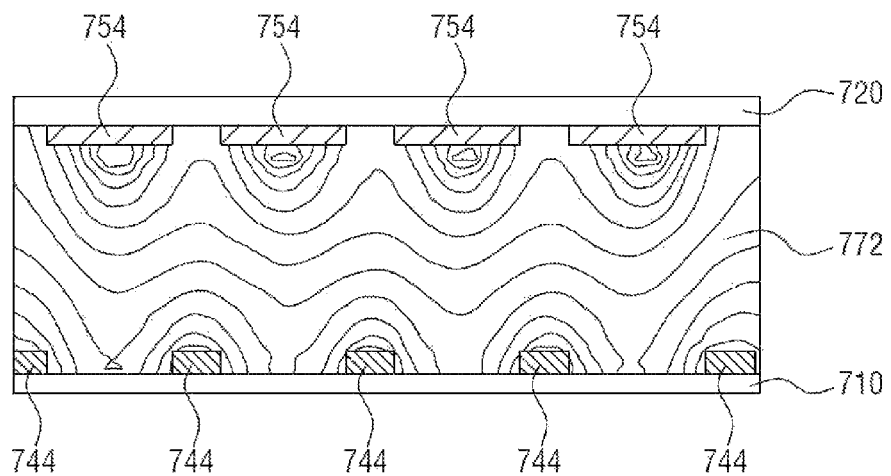

FIGS. 7A and 7B are schematic views of electric power lines for explaining an electric field of a light-controlling device according to an exemplary embodiment of the present invention. Although it is assumed in FIGS. 7A and 7B that the light-controlling particles are distributed in an optical medium layer between a first substrate 710 and a second substrate 720, the illustration of the light-controlling particles is omitted in FIGS. 7A and 7B for brevity.

Referring to FIG. 7A, a first substrate 710 and a second substrate 720 may be formed opposite each other, collecting electrodes 743 may be formed on the first substrate 710, and a common electrode 753 may be formed on the second substrate 720. The electric field 771 may be formed around the collecting electrodes 743. The electric field 771 of the collecting electrodes 743 may be formed around the collecting electrodes 743 such that the magnitude of the electric field is relatively weaker as the distance from the collecting electrodes 743 increases. As shown, the electric field 771 of the collecting electrodes 743 may be formed on sides of the collecting electrodes 743. Accordingly, although not shown in FIG. 7A, when the light-controlling particles are distributed between the first and second substrates 710 and 720, the light-controlling particles may move not only to a top surface of the collecting electrode 743 but also to both side surfaces of the collecting electrodes 743. Meanwhile, the common electrode 753 is un-patterned.

As in FIG. 7A, on one side of the first substrate 710, electric fields may be formed around the plurality of collecting electrodes 743 and the common electrode 753. When the voltage is applied to the collecting electrode 743, the light-controlling particles may be disposed around the collecting electrode 743 so that the light-controlling device operates under the transparent mode. Thereafter, when a voltage is applied to the common electrode 753, the light-controlling particles collected by the collecting electrode 743 may move to the surface of the common electrode 753 due to the electric fields. In this case, however, the light-controlling particles may not spread over the common electrode 753 evenly, but collected on the areas of the common electrode 753 directly opposite from the collecting electrodes 743. This is because the common electrode 753 does not apply sufficient electric field to spread the light-controlling particles over the common electrode 753.

Referring to FIG. 7B, a first substrate 710 and a second substrate 720 may be formed opposite to each other, the collecting electrodes 744 and the spread electrodes may be formed on the first substrate 710 and the second substrate 720 in an alternating arrangement. As a result, more optimal electric fields 772 may be formed around the collecting electrodes 744 and the spreading electrodes 754.

When a predetermined voltage is applied to the collecting electrodes 744, the light-controlling particles are collected around each of the collecting electrodes 744 so that the light-controlling device can enter the transparent mode. Thereafter, when a predetermined voltage is applied to the spreading electrodes 754, the light-controlling particles collected on the collecting electrodes 744 move towards the second substrate 720 due to the vertical direction electric field, and simultaneously, move towards the center of the spreading electrode 754 due to horizontal direction electric field generated by the spreading electrode 754. In this case, the spreading electrodes 754 are disposed in a staggered position with respect to the collecting electrodes 744, and thus, the light-controlling particles can receive both the horizontal and vertical direction electric fields from the spreading electrodes 754. As a result, the light-controlling particles can be distributed more evenly over the spreading electrodes 754.

When the spread ratio of the light-controlling particles is increased during the application of the voltage to the spreading electrodes 754, a shielding rate of the light-controlling device may be increased in the shielding mode. When the shielding ratio of the light-controlling device is increased, light may not leak so that high light absorbance may be obtained. Also, when the light-controlling device is disposed on a rear surface of a transparent display device, a contrast ratio may be improved.

When the concentration of the light-controlling particles is increased, it may be difficult to control the light-controlling particles around the collecting electrodes 744 and collect the light-controlling particles around the collecting electrode 744 in the transparent mode, thereby degrading transmittance. Accordingly, in the light-controlling device, a shielding rate and transmittance may have a trade-off relationship with each other. The light-controlling device of the present invention has the collecting electrodes 744 and the spreading electrodes 754 that are disposed in the staggered position with respect to each other so as to apply horizontal electric force to the light-controlling particles. Therefore, a spread ratio of light-controlling particles may be improved without increasing the concentration of the light-controlling particles. As a result, the shielding rate and transmittance of the light-controlling device may be simultaneously increased.

Hereinafter, constructions capable of not only improving a spread ratio of light-controlling particles to maintain transmittance of a light-controlling device and increase a shielding rate thereof, but also efficiently controlling the light-controlling particles to increase transmittance of the light-controlling device, will be described.

Figure 8:
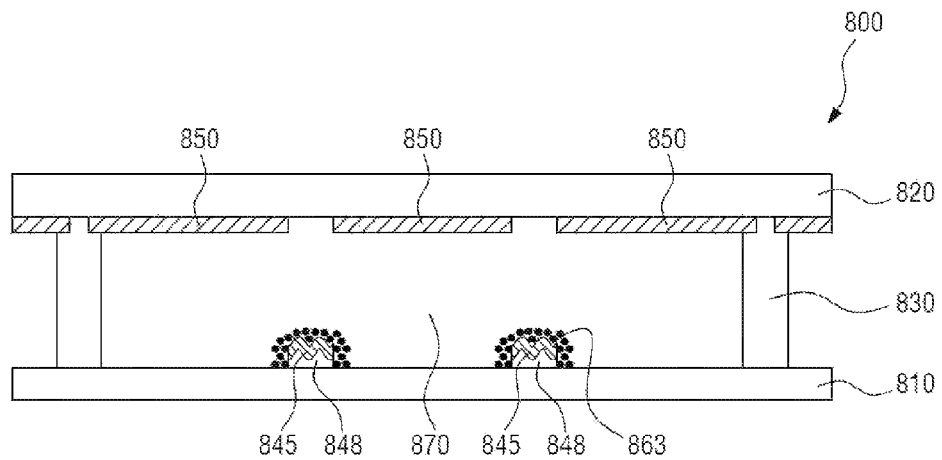
FIGS. 8 through 11 are cross-sectional views of a light-controlling device according to the respective exemplary embodiments of the present invention.

FIG. 8 is a cross-sectional view of a light-controlling device according to various exemplary embodiments of the present invention. Since a first substrate 810, a second substrate 820, partition walls 830, a spreading electrode 850, and an optical medium layer 870 are the same as the first substrate 210, the second substrate 220, the partition walls 230, the spreading electrode 250, and the optical medium layer 270, a repeated description thereof is omitted for brevity.

As shown in FIG. 8, a polymer 848 may be formed on the first substrate 810, and a collecting electrode 845 may be formed on the polymer 848. A surface of the collecting electrode 845 can include a buckling structure or a plurality of projections/depressions. The formation of the projections/depressions on the surface of the collecting electrodes 845 may refer to alternately forming protrusions and recesses on the surface of the collecting electrodes 845. The plurality of projections/depressions may have streamline shapes as shown in FIG. 8. Although FIG. 8 illustrates the plurality of projections/depressions as having streamlined or semicircular sectional shapes, the present invention is not limited as such. Accordingly, the plurality of projections/depressions may have tetragonal sectional shapes or tapered sectional shapes. Also, the projections/depressions may be referred to as protuberances.

Buckling refers to lateral displacement, which occurs when the collecting electrodes 845 is applied with predetermined force or more in an axial direction and bent in a lateral direction. The buckling structure may include any surface shape that may be formed due to buckling. The buckling structure may include projections/depressions. The generation of the plurality of projections/depressions on the surface of the collecting electrodes 845 may refer to forming projections/depressions on the surface of the collecting electrodes 845, or forming a buckling structure on the surface of the collecting electrodes 845. A rough portion may be expressed as surface roughness.

Hereinafter, an example in which a buckling structure is formed on the surface of the collecting electrodes 845 will be described for brevity, but the surface of the collecting electrodes 845 may be surface-processed. The surface processing process may include all processes of applying an additional process to the collecting electrodes 845 or increasing the surface area of the collecting electrodes 845 using the properties of a material forming the collecting electrodes 845. The surface processing process may include performing a texturing process to increase surface roughness, forming a buckling structure, or forming protuberances or projections/depressions on the surface of the collecting electrodes 845.

The surface of the collecting electrodes 845 may include a plurality of protruding projections/depressions. In a transmission mode, the light-controlling particles 863 may be collected on the surface of the collecting electrodes 845, and incident light may be transmitted through the light-controlling device 800. When the light-controlling particles 863 move to surfaces of the light-controlling device 800 other than the collecting electrodes 845, light may be absorbed or scattered due to the light-controlling particles 863, thereby degrading transmittance. To increase the number of the light-controlling particles 863 collected in the collecting electrodes 845, the width of the collecting electrodes 845 may be increased as described above. In this case, however, an aperture ratio may be reduced. A drop in aperture ratio may lead to a reduction in the transmittance of incident light. Conversely, when the width of the collecting electrodes 845 is reduced as contrasted with the concentration of the light-controlling particles 863, the light-controlling particles 863 may be collected not only on the surface of the collecting electrodes 845 but also on a substrate disposed around the collecting electrodes 845. In this case, since the light-controlling particles 863 are present outside the area of the collecting electrodes 845, the transmittance of light may be degraded. Meanwhile, another method for collecting the light-controlling particles 863 on the surface of the collecting electrodes 845 may include expanding a surface area of the collecting electrodes 845 so that more light-controlling particles 863 can be collected on the surface of the collecting electrodes 845. The surface area of the collecting electrodes 845 may be equal to or greater than an area thereof.

In the light-controlling device 800, the plurality of projections/depressions formed on the surface of the collecting electrodes 845 may be formed to contain at least one charged particle 863. An interval between the projections/depressions may refer to an interval between two projections/depressions and be greater than a diameter of the light-controlling particles 863 to contain the light-controlling particles 863. The interval between the projections/depressions or a height or step difference of the projections/depressions may depend on the diameter of the light-controlling particles 863. Also, the height of the projections/depressions may depend on the height of cells.

Since the plurality of projections/depressions formed on the collecting electrodes 845 may be irregularly generated, the respective projections/depressions may have different widths w and heights h. The width w of the projections/depressions may refer to a horizontal distance between bottom portions of recesses, or a horizontal distance between top portions of protrusions. The height h of the projections/depressions may refer to a vertical distance between a bottom portion of a recess and a top portion of a protrusion. The width w and height h of the plurality of projections/depressions may be variously determined in consideration of process conditions, for example, the diameter of light-controlling particles 863 of the light-controlling device 800.

When the plurality of projections/depressions is formed on a top surface of the collecting electrodes 848, a surface area of the collecting electrodes 848 may increase. The surface area of the collecting electrodes 848 may increase in proportion to the height of the projections/depressions. Accordingly, a space in which the light-controlling particles 863 may be contained may increase in proportion to the height of the projections/depressions. However, when the height of the collecting electrodes 845 is excessively increased as compared with a cell height of the light-controlling device 800, the reliability and shielding rate of the light-controlling device 800 may be reduced. Thus, the height of the collecting electrodes 845 including the height of the projections/depressions may be limited. Meanwhile, since a potential of an electric field of the collecting electrode 845 may be increased with a rise in the surface area of the collecting electrode 845, when projections/depressions are formed on the collecting electrodes 845, it becomes easier to control the light-controlling particles 863.

In the light-controlling device 800 according to one exemplary embodiment of the present invention, transmittance may be increased using the collecting electrodes 845 including the plurality of projections/depressions. When a voltage is applied to the collecting electrodes 845 in the transparent mode, the light-controlling particles 863 may be initially contained in the projections/depressions formed on the surface of the collecting electrodes 845, and stacked so that many light-controlling particles 863 can be collected as much as possible within a limited width of the collecting electrodes 845. Accordingly, by forming the plurality of projections/depressions on the collecting electrodes 845, transmittance may be increased in the transparent mode without degrading a shielding rate.

The plurality of projections/depressions formed on the surface of the collecting electrodes 845 may be formed using various methods. Hereinafter, a buckling structure formed on the surface of the collecting electrodes 845 using the polymer 848 will be described.

The polymer 848 may be formed on the first substrate 810, and collecting electrodes 845 may be formed on the polymer 848. The surface of the collecting electrodes 845 may be formed in accordance to a shape of the polymer 848, and a plurality of projections/depressions may be formed on the surface of the collecting electrodes 845. The polymer 848 may have a specific glass transition temperature Tg. The polymer 848 may be a solid at the specific glass transition temperature Tg or lower, while the polymer 848 may make a phase transition to a rubber state above the specific glass transition temperature Tg. The polymer 848 may become ductile and flexible in the rubber state. When a temperature drops again to the glass transition temperature Tg or lower, the polymer 848 may make a phase transition to a solid state. In this process, a surface of the polymer 848 may form a buckling structure. Due to a change in the shape of the polymer 848, compressive stress and tensile stress may be applied to the collecting electrodes 845 disposed on the polymer 848. Since the compression stress and the tensile stress act on the collecting electrodes 845 at the same time, the surface of the collecting electrodes 845 may be formed in accordance to the buckling structure formed on the surface of the polymer 848.

The polymer 848 may be formed to a thickness of about 10 nm to about 5 μm, and the collecting electrodes 845 may be formed to a thickness of about 10 nm to about 1 μm. When each of the polymer 848 and the collecting electrodes 845 has a thickness of about 10 nm or less, it may be difficult to form a buckling structure due to the phase transition. When the polymer 848 has a thickness of about 5 μm or more and the collecting electrodes 845 has a thickness of about 1 μm or more, it may be necessary to perform a process of forming the buckling structure at an excessively high temperature.

When the polymer 848 is formed on the first substrate 810 before the collecting electrodes 845, adhesive strength between the first substrate 810 and the polymer 848 may be stronger, the size of projections/depressions may be controlled more easily, and a surface area may be further increased, as compared with a case in which the collecting electrodes 845 is stacked directly on the first substrate 810. As a result, by expanding the surface area of the collecting electrodes 845, a larger number of light-controlling particles 863 may be collected on the surface of the collecting electrodes 845 and agglomerate on the collecting electrodes 845, thereby increasing transmittance of the light-controlling device 800.

Figure 9:
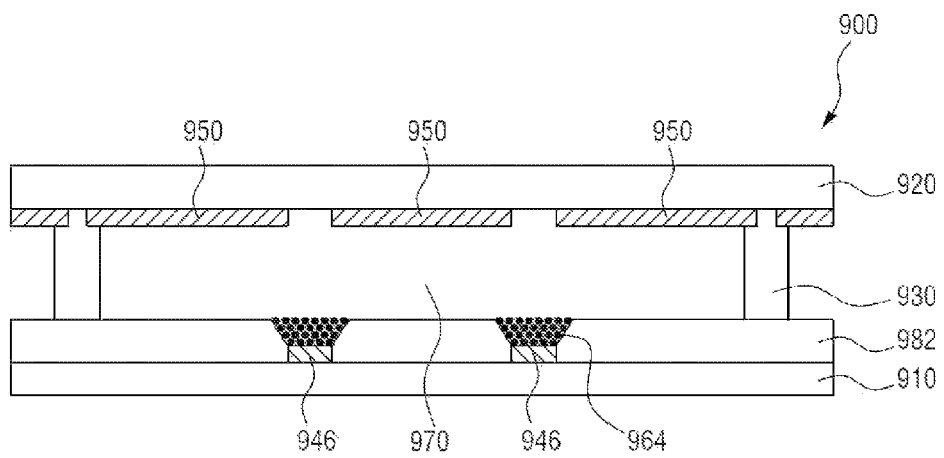

FIG. 9 is a cross-sectional view of a light-controlling device according to various exemplary embodiments of the present invention. Since a first substrate 910, a second substrate 920, partition walls 930, a spreading electrodes 950, and an optical medium layer 970 are the same as the first substrate 210, the second substrate 220, the partition walls 230, the spreading electrodes 250, and the optical medium layer 270 described with reference to FIG. 2, a repeated description thereof is omitted for brevity.

One or more insulating structures 982 may be formed on the first substrate 910 to surround the collecting electrodes 946 as shown in FIG. 9. The insulating structure 982 may be formed to guide the light-controlling particles 964 to the collecting electrodes 946 disposed in hollow space formed by the insulating structure 982. Accordingly, the insulating structure 982 may be referred to as a particle guidance member. The insulating structure 982 may include an organic insulating material, for example, any one of polyimide (PI), photoacryl, and benzocyclobutene (BCB) or photoresist.

The insulating structure 982 may be formed to a greater thickness than the collecting electrodes 946. When the insulating structure 982 has a smaller thickness than the collecting electrodes 946, it may be difficult to induce the light-controlling particles 964 to the collecting electrodes 946. The thickness of the insulating structure 982 may depend on the concentration of the light-controlling particles 964. The insulating structure 982 may have such a great thickness as to induce the light-controlling particles 964 to the surface of the collecting electrodes 946 and contain the light-controlling particles 964, and have such a small thickness as not to degrade transmittance in the transmission mode.

As mentioned above, the insulating structure 982 may have an opening formed to expose the collecting electrodes 946, or two or more insulating structures 982 can be formed to surround the collecting electrode 946 in between the insulating structures 982. Referring to FIG. 9, the insulating structure 982 may have a tapered shape. An angle formed by a surface parallel to the first substrate 910 with a side surface of an opening or the insulating structure 982, may be between about 30° and about 90°. When the angle is equal to or less than about 30°, it may not be easy to induce the light-controlling particles 964 to the collecting electrodes 946. When the angle is equal to or larger than about 90°, it may not be easy to induce the light-controlling particles 964, or for the light-controlling particles 964 to escape from the opening due to friction. Thus, controlling the light-controlling particles 964 may be difficult. The opening formed in the insulating structure 982 of the light-controlling device according to the exemplary embodiment of the present invention may have a round cross-section. When the side surface of the insulating structure 982 has the round cross-section, an angle formed by the surface parallel to the first substrate 910 with the side surface of the insulating structure 982 may be defined as an angle formed by a plane surface contacting a surface opened in a position corresponding to half the height of the insulating structure 982 with the surface parallel to the first substrate 910.

When a voltage is applied to the collecting electrodes 946, an electric field may be formed around the collecting electrodes 946. The electric field of the collecting electrodes 946 may spread out around the collecting electrodes 946 and become weaker far away from the collecting electrodes 946. Accordingly, when the insulating structure 982 is not provided and the light-controlling particles 964 are distributed between the first and second substrates 910 and 920, the light-controlling particles 964 may move not only to a top surface of the collecting electrodes 946 but also to both side surfaces of the collecting electrodes 946. In this case, when incident light reaches the light-controlling particles, the incident light may be absorbed or refracted, thereby degrading transmittance of the light-controlling device 900.

When light-controlling particles 964 are distributed between the first and second substrates 910 and 920 of the light-controlling device 900 having the insulating structure 982, the light-controlling particles 964 may not move to both side surfaces of the collecting electrodes 946 due to the insulating structure 982 but move to a top surface of the collecting electrodes 946. Also, the insulating structure 982 may include an inverted tapered opening to enable light-controlling particles 946 moving to the collecting electrodes 946 to be collected toward the collecting electrodes 946. When the light-controlling particles 964 are move on the inclined side surfaces of the opening, the light-controlling particles 964 can be further guided towards the collecting electrodes 946 due to an electric field of the collecting electrodes 946.

The light-controlling particles 964 may be disposed within the opening of the insulating structure 982. As described above, the light-controlling particles 964 may move due to the electric field of the collecting electrodes 946, and the light-controlling particles 964 may be guided not to the side surfaces of the collecting electrodes 946 but to the top surface of the collecting electrodes 946 due to the insulating structure 982. Accordingly, an angle formed by the side surface of the opening with a surface parallel to the first substrate 910 may range from about 30° to about 90°, preferably, about 40° to about 80° so that the light-controlling particles 964 may be guided.

Figure 10:
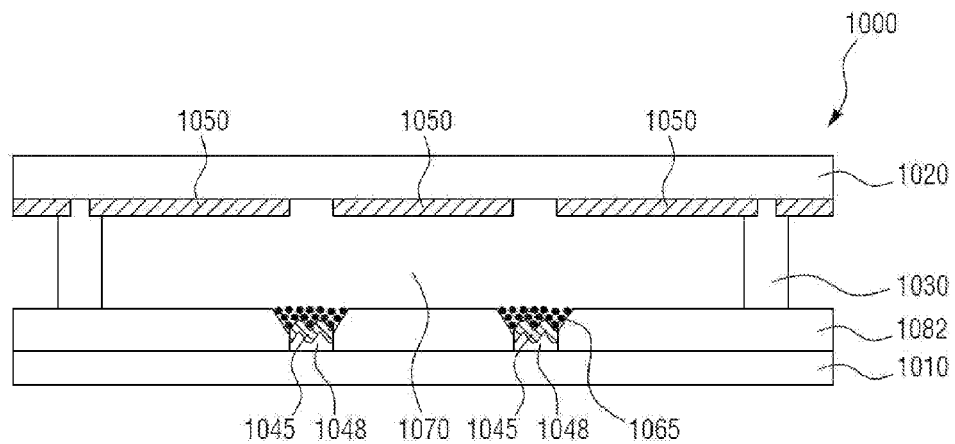

FIG. 10 is a cross-sectional view of a light-controlling device according to various exemplary embodiments of the present invention. Since a first substrate 1010, a second substrate 1020, partition walls 1030, a spreading electrodes 1050, and an optical medium layer 1070 are the same as the first substrate 210, the second substrate 220, the partition walls 230, the spreading electrodes 250, and the optimum medium layer 270, a repeated description thereof is omitted for brevity.

Referring to FIG. 10, a polymer 1048, a collecting electrodes 1045 having a surface on which a buckling structure is formed, and an insulating structure 1082 may be formed on the first substrate 1010. Light-controlling particles 1065 may be disposed within an opening of the insulating structure 1082.

When a voltage is applied to the collecting electrodes 1045, since the light-controlling particles 1065 are collected on a top surface of the collecting electrodes 1045 due to the collecting electrodes 1045 having the buckling structure, and the insulating structure 1082 configured to guide the light-controlling particles 1065 to the surface of the collecting electrodes 1045, transmittance of the light-controlling device may be improved in a transparent mode.

Meanwhile, since the spreading electrodes 1050 formed on the second substrate 1020 are formed to be in an alternating arrangement with respect to the collecting electrodes 1045 or staggered with respect to the collecting electrodes 1045, when a voltage is applied to the spreading electrodes 1050, horizontal electric force may be applied to the light-controlling particles 1065 so that left and right spreading characteristic of the light-controlling particles 1065 can be improved. Accordingly, the light-controlling device 1000 may collect the light-controlling particles 1065 to the top surface of the collecting electrodes 1065 to increase transmittance, and maximize the left and right spreading characteristic on the spreading electrodes 1050 to increase a shielding rate. Thus, the transmittance and shielding rate, which may have a trade-off relationship with each other, may be improved at the same time. Furthermore, since the transmittance and shielding rate may be increased at the same time without increasing the concentration of the light-controlling particles 1065, or changing an interval between the collecting electrodes 1045, efficiency of the light-controlling device 1000 may increase.

Figure 11:
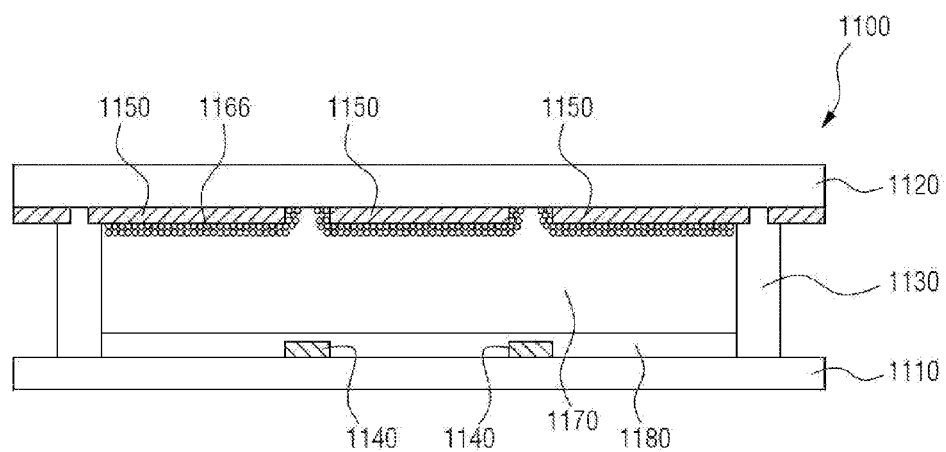

FIG. 11 is a cross-sectional view of a light-controlling device according to various exemplary embodiments of the present invention. Since a first substrate 1110, a second substrate 1120, partition walls 1130, collecting electrodes 1140, spreading electrodes 1150, and an optical medium layer 1170 are the same as the first substrate 210, the second substrate 220, the partition walls 230, the collecting electrodes 240, the spreading electrodes 250, and the optical medium layer 270 described with reference to FIG. 2, a repeated description thereof is omitted for brevity.

In FIG. 11, white light-controlling particles 1166 or transparent light-controlling particles having a high refractive index are used instead of black light-controlling particles. Black light-controlling particles may absorb light, while the white light-controlling particles 1166 or the transparent light-controlling particles having the high refractive index may scatter incident light. The white light-controlling particles 1166 may refract light incident to the white charged particle 1166 and cause scattering of light. Hereinafter, the white light-controlling particles 1166 will be described in detail. Although it is assumed that the white light-controlling particles 1166 carry negative electric charges, it would be apparent to those of ordinary skill in the art that the white light-controlling particles 1166 may carry positive electric charges.

To drive the light-controlling device 1100, when a positive voltage is applied to the spreading electrodes 1150, the white light-controlling particles 1166 carrying the negative electric charges may move toward the spreading electrodes 1150. For brevity, after light incident toward the second substrate 1120 is described, light incident toward the first substrate 1110 will be described. Incident light may be refracted or reflected at an upper portion of the first substrate 1110 or the second substrate 1120, or upper and lower portions of the spreading electrodes 1150, but it is assumed for brevity that interfacial characteristics of the incident light are ignored.

Due to the above-described voltage application, the white light-controlling particles 1166 may move toward the second substrate 1120 and be disposed to surround the spreading electrodes 1150. Light incident toward the second substrate 1120 may pass through the second substrate 1120 and the spreading electrodes 1150, reach the white light-controlling particles 1166, and be scattered by the white light-controlling particles 1166. Although FIG. 11 illustrates that the white light-controlling particles 1166 are arranged in two columns, the white light-controlling particles 1166 may be arranged in two or more columns based on the concentration of light-controlling particles. Light scattered between the white light-controlling particles 1166 may be scattered again by adjacent white light-controlling particles 1166, and escape from the second substrate 1120. Due to the arrangement of the white light-controlling particles 1166, an opaque region may be visible at an upper portion of the light-controlling device 1100.

Since the above-described arrangement of the white light-controlling particles 1173 due to the voltage application causes scattering of incident light, a current state of the light-controlling device 1100 may be referred to as an opaque mode.

Hereinafter, light incident toward the first substrate 1110 will be described. The light incident toward the first substrate 1110 may be transmitted through the first substrate 1110, reach the white light-controlling particles 1166, and be scattered by the white light-controlling particles 1166. Accordingly, an opaque region may also be visible at a lower portion of the light-controlling device 1100 in the opaque mode.

When black light-controlling particles are used to absorb light and a projection image is irradiated, the resolution of the projection image may be reduced, thereby degrading visibility. However, since the white light-controlling particles 1166 are highly capable of dispersing incident light and embodying an opaque state, when a projection image is irradiated in the opaque state, a projection screen may have good visibility and embody high-resolution images.

When each of the spreading electrodes 1150 and the collecting electrodes 1140 is light-transmissive and white light-controlling particles 1166 are used, light incident to the collecting electrodes 1140 may not also be absorbed but be scattered just as the above-described movement of incident light. Accordingly, when the white light-controlling particles 1166 are used, a high-transmittance light-controlling device having transmittance of about 70% or more may be embodied.

An insulating protection layer 1180 may be formed on the collecting electrodes 1140. The protection layer 991 or 1091 may be formed of both a light-transmissive material and an insulating material, which may be one of alumina ($Al_2O_3$) and silicon oxide ($SiO_2$). Since the protection layer 991 or 1091 is formed on the surface of the collecting electrodes 1140, the protection layer 991 or 1091 may be thinly formed not to planarize the surface of the electrode 983 or 1083. The protection layer 991 or 1091 may be formed using a chemical vapor deposition (CVD) process. The protection layer 991 or 1091 may be stacked using any material or method capable of forming an insulating layer to prevent light-controlling particles from being in direct contact with the collecting electrodes 1140, and not to planarize the collecting electrodes 1140. However, to improve transmittance, a portion of the protection layer 991 or 1091, which may transmit light, may be formed of a material having a similar refractive index to a material formed on top and bottom surfaces of the protection layer 991 or 1091.

An insulating protection layer 1180 may be formed on the collecting electrodes 1140. The protection layer 1180 may be referred to as an insulating layer. The protection layer 1180 may be formed of both a light-transmissive material and an insulating material, which may be one selected out of alumina ($Al_2O_3$) and silicon oxide ($SiO_2$). The protection layer 1180 formed on the collecting electrodes 1140 as described above may be formed to prevent the white light-controlling particles 1166 from directly contacting the collecting electrodes 1140. The protection layer 1180 may be formed using a chemical vapor deposition (CVD) process. The protection layer 1180 may be formed using any material or method capable of forming an insulating layer to prevent the white light-controlling particles 1166 from directly contacting the collecting electrodes 1140. However, to improve transmittance, a portion of the protection layer 1180, which may transmit incident light, may be formed of a material having a similar refractive index to a material formed on top and bottom surfaces of the protection layer 1180.

Figure 12:
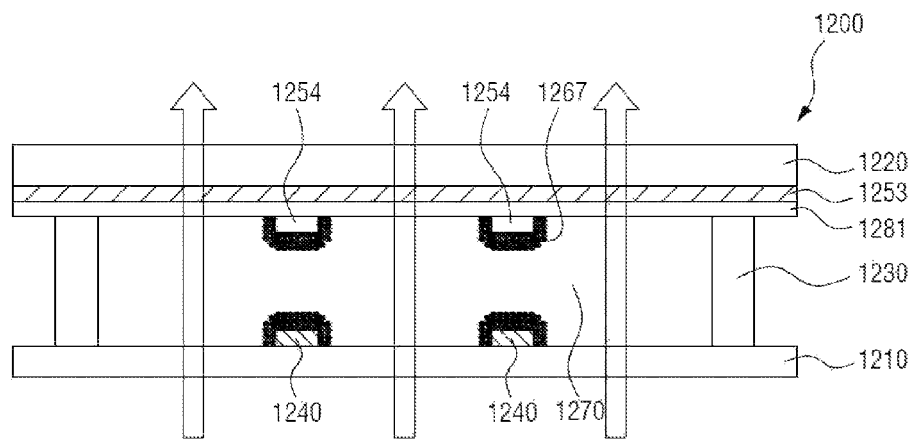
FIGS. 12 and 13 are cross-sectional views of a light-controlling device according to the respective exemplary embodiment of the present invention.
Figure 13:
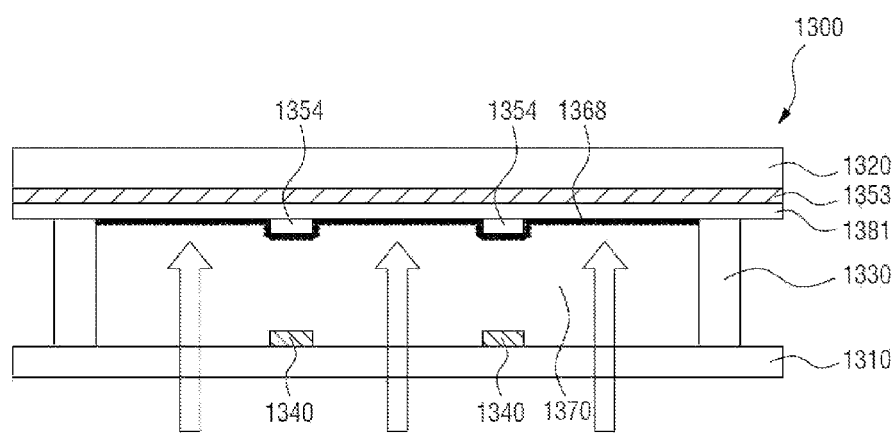

FIGS. 12 and 13 are cross-sectional views of a light-controlling device according to another exemplary embodiment of the present invention. Since a first substrate 1210 or 1310, a second substrate 1220 or 1320, partition walls 1230 or 1330, and an optical medium layer 1270 or 1370 are the same as the first substrate 1210, the second substrate 1220, the partition walls 1230, and the optical medium layer 270 described with reference to FIG. 2, a repeated description thereof is omitted for brevity.

A common electrode 1253 or 1353 may be formed on the second substrate 1220 or 1320. The common electrode 1253 or 1353 may be a conductive structure formed on the second substrate 1220 or 1320 parallel to the second substrate 1220 or 1320. The common electrode 1253 or 1353 may be formed of a transparent conductive material or a conductive metal material. For example, the common electrode 1253 or 1353 may be formed of indium tin oxide (ITO), indium zinc oxide (IZO), carbon nanotubes (CNTs), graphene, or PEDOT:PSS. Alternatively, the common electrode 1253 or 1353 may be formed of a metal, such as chromium, silver, aluminum, copper, magnesium-silver, magnesium-calcium, aluminum-silver, or ytterbium-silver Z.

An insulating layer 1281 or 1381 may be formed on the common electrode 1253 or 1353, and a third electrode 1254 or 1354 may be formed on the insulating layer 1281 or 1381.

The third electrode 1254 or 1354 may be a conductive structure formed on the second substrate 1210 or 1310 and disposed to completely and directly opposite to the collecting electrodes 1240 or 1340. The third electrode 1254 or 1354 may be formed of a transparent conductive material. For example, the third electrode 1254 or 1354 may be formed of a material, such as ITO, IZO, CNTs, graphene, or PEDOT:PSS.

FIG. 12 illustrates a state in which a positive voltage is applied to the collecting electrodes 1240 and the third electrode 1254. A reference voltage or a voltage of about 0V may be applied to the common electrode 1253 disposed on the second substrate 1220 or the common electrode 1253 may be in a ground state or a floating state.

Due to the above-described voltage application, the light-controlling particles 1267 may move and be collected on three surfaces of each of the collecting electrodes 1240 and each of the third electrodes 1254.

Light incident from the first substrate 1120 to the light-controlling device 1200 may sequentially pass through the first substrate 1210, the optical medium layer 1270, the insulating layer 1281, the common electrode 1253, and the second substrate 1220, and escape from the light-controlling device 1200. Since the incident light is transmitted through the light-controlling device 1200, an object disposed on a rear surface of the light-controlling device 1200 may be visible in a lower portion of the light-controlling device 1200. Since light is transmitted due to the above-described arrangement of the light-controlling particles 1267 with the voltage application, a current state of the light-controlling device 1200 may be referred to as a transmissive mode or a transparent mode.

Light incident toward the second substrate 1220 may also be transmitted. The light incident toward the second substrate 1220 may be transmitted through the second substrate 1220, the common electrode 1253, the optical medium layer 1270, and the first substrate 1210, and escape from the light-controlling device 1200. Accordingly, the object disposed on the rear surface of the light-controlling device 1200 may also be visible at an upper portion of the light-controlling device 1200 in the transparent mode.

FIG. 13 illustrates a state in which a positive voltage is applied to the common electrode 1353 and the third electrode 1354 formed on the second substrate 1320. Also, a reference voltage or a voltage of about 0V may be applied to the collecting electrodes 1340 disposed on the first substrate 1310, or the first substrate 1340 may be in a ground state.

Due to the above-described voltage application, light-controlling particles 1368 may move toward the second substrate 1320 and be disposed to cover regions corresponding to three surfaces of the third electrode 1354 and the common electrode 1353. Part of light incident to the light-controlling device 1300 may pass through the first substrate 1310, reach the light-controlling particles 1368, and be absorbed in the light-controlling particles 1368.

Although FIG. 13 illustrates an example in which the light-controlling particles 1368 are arranged in one column, the light-controlling particles 1368 may be arranged in one or more columns based on the concentration of the light-controlling particles 1368. In this case, even light passing between the light-controlling particles 1368 or light reflected by the light-controlling particles 1368 may be absorbed by adjacent light-controlling particles 1368.

A black color may be visible in the upper portion of the light-controlling device 300 due to the above-described arrangement of the light-controlling particles 1368. Since light is shielded due to the arrangement of the light-controlling particles 1368 with the voltage application, a current state of the light-controlling device 1300 is referred to as a shielding mode.

In the light-controlling device 1300 according to an exemplary embodiment of the present invention, light incident toward the second substrate 1320 may also be shielded. For example, when light is incident toward the second substrate 1320, the incident light may be transmitted through the second substrate 1320, the common electrode 1354, the insulating layer 1381, and/or the third electrode 1354, reach the light-controlling particles 1368, and be absorbed by the light-controlling particles 1368. Accordingly, a black color may be visible also in the upper portion of the light-controlling device 1300 in the shielding mode.

Alternatively, a light-controlling device according to another exemplary embodiment of the present invention may be configured such that an electrode is formed only on a first substrate without forming an electrode on a second substrate. The light-controlling device may include a plurality of collecting electrodes formed on the first substrate, a first insulating layer formed on the collecting electrodes, spreading electrodes formed on the first insulating layer between the plurality of collecting electrodes, and light-controlling particles dispersed between the first and second substrates. That is, the collecting electrodes and the spreading electrodes may be formed in an alternating arrangement. In the light-controlling device, when a voltage is applied to the collecting electrodes, the light-controlling particles may be disposed to surround the collecting electrodes, and enter a transparent mode. When a voltage is applied to the spreading electrodes, the light-controlling particles may spread around the spreading electrodes and to regions between the collecting electrodes and the spreading electrodes, and enter a shielding mode. In this case, the collecting electrodes may be formed of an opaque material.

Figure 14:
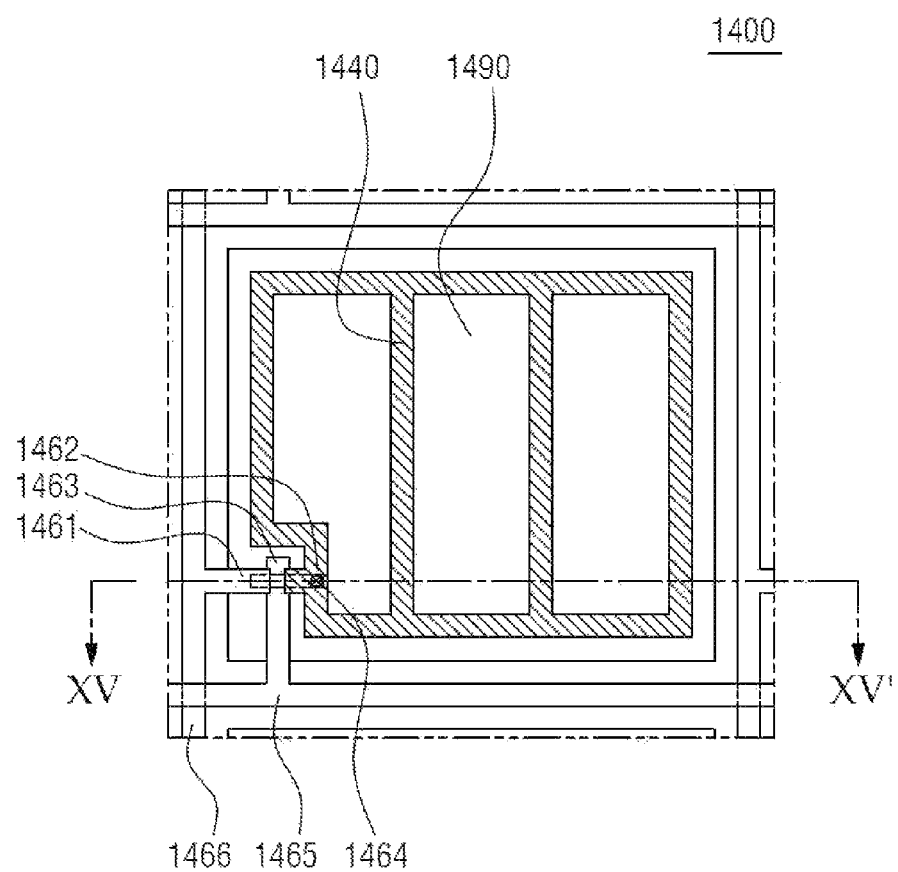
FIG. 14 is a plan view of an active-matrix-type light-controlling device to which a light-controlling device according to the respective exemplary embodiments of the present invention may be applied.
Figure 15:
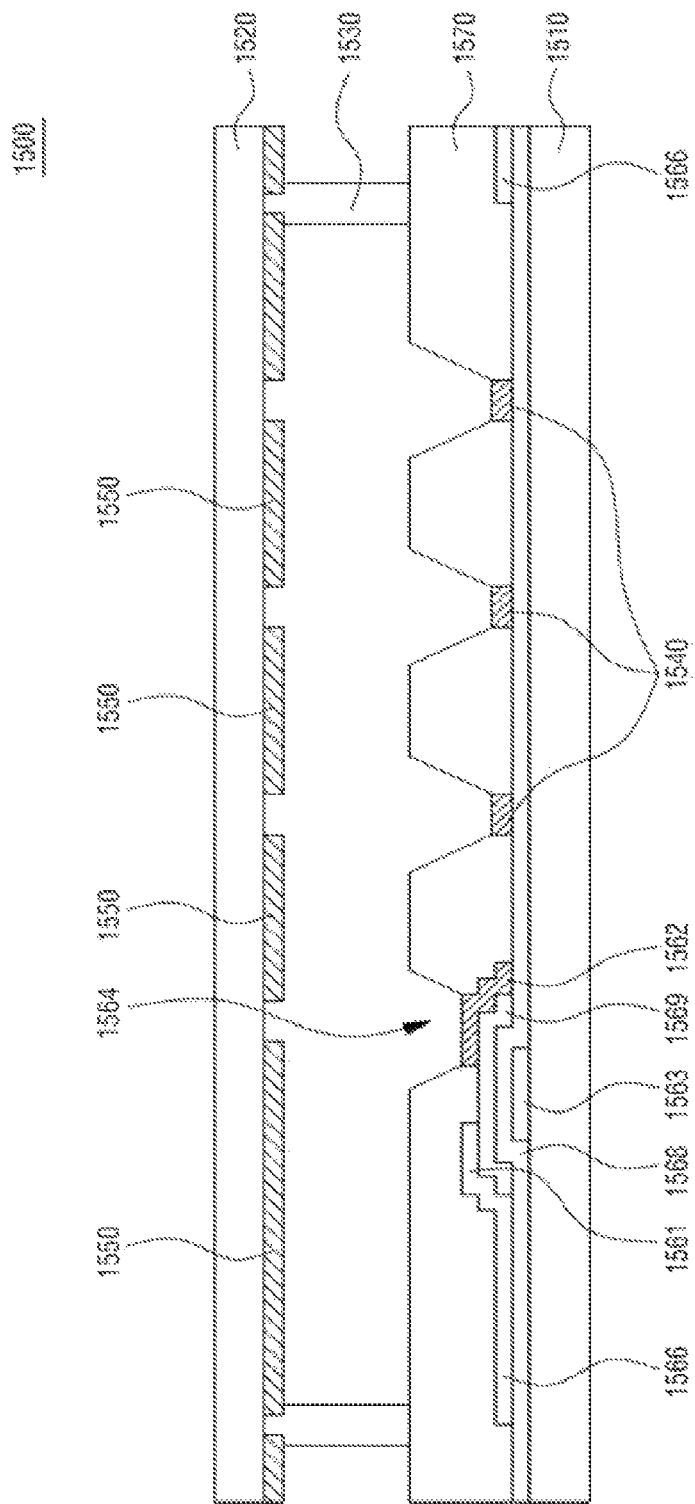
FIG. 15 is a cross-sectional view of an active-matrix-type light-controlling device in FIG. 14, which is taken along line XV-XV' of FIG. 14.

FIG. 14 is a plan view of an active-matrix-type light-controlling device to which a light-controlling device according to various exemplary embodiments of the present invention may be applied. FIG. 15 is a cross-sectional view of the active-matrix-type light-controlling device, which is taken along line XV-XV' of FIG. 14. Although the illustration of light-controlling particles is omitted in FIG. 15 for brevity, the light-controlling particles may be distributed between a first substrate 1510 and a second substrate 1520.

Referring to FIGS. 14 and 15, each of cells 1490 of a light-controlling device 1400 or 1500 may include a first substrate 1510, a second substrate 1520, a thin film transistor (TFT) formed on the first substrate 1510, a collecting electrodes 1440 or 1540, a spreading electrodes 1550 formed on the second substrate 1520, an insulating structure 1570 formed on the first substrate 1510, and partition walls 1530. FIGS. 14 and 15 illustrate fourth electrodes formed in one cell in a widthwise direction, but a structure in which the collecting electrodes 1440 or 1540 is formed in the cell 1490 is not limited thereto. The collecting electrodes 1440 or 1540 disposed in the cell 1490 may be configured to maximize an aperture ratio, accelerate movement of light-controlling particles, and increase a spreading characteristic. For example, the collecting electrodes 1440 or 1540 disposed in the cell 1490 may have a lattice shape, a diamond shape, a honeycomb shape, or a clamp shape.

At least one conductive material layer and at least one insulating material layer may be formed on the first substrate 1510. The conductive material layer may include various electrodes and lines configured to apply signals to the various electrodes. The conductive material layer may include a gate electrode 1463 or 1563, a source electrode 1461 or 1561, a drain electrode 1462 or 1562, and collecting electrodes 1440 or 1540. The lines may include a plurality of gate lines 1465 electrically connected to the gate electrode 1463 or 1563, and a plurality of data lines 1466 electrically connected to the source electrode 1461 or 1561.

As shown in FIG. 15, the drain electrode 1562 may be formed of the same material as the collecting electrodes 1540 and function as the above-described collecting electrodes 1540. Alternatively, the collecting electrodes 1540 may be formed of a different conductive material from the drain electrode 1562 and stacked on the drain electrode 1562. The collecting electrodes 1540 may be exposed by an opening 1464 or 1564 of the insulating structure 1570.

Furthermore, at least one switching element 1569 may be formed on the first substrate 1510. In another exemplary embodiment of the present invention, a TFT may be formed on the first substrate 1510 and connected to the gate lines 1465 and the data lines 1466 or 1566. The TFT may correspond to at least one drain electrode 1569 and turn on and off a voltage applied to the drain electrode 1569.

The gate line 1465 may extend in a first direction of the first substrate 1510. For example, the gate lines 1465 may be formed in a widthwise direction of the first substrate 1510. The gate lines 1465 may include a single layer formed of a metal, such as silver (Ag) or aluminum (Al), or an alloy thereof. Alternatively, the gate lines 1465 may include a multilayered structure including the above-described single layer and another layer formed of a material having good physical and electrical contact characteristics, such as chromium (Cr), titanium (Ti), or tantalum (Ta).

The data lines 1466 or 1566 may extend in a second direction of the first substrate 1510. For instance, the data lines 1466 may be formed in a lengthwise direction of the second substrate 1520. The data lines 1466 may include a single layer formed of a metal, such as silver, or aluminum, or an alloy thereof. Alternatively, the data lines 1466 may include a multilayered structure including the above-described single layer and another layer formed of a material having physical and electrical contact characteristics, such as chromium, titanium, or tantalum. The data lines 1466 or 1566 and the gate lines 1465 may be formed on the first substrate 1510 and divide unit cells 1490 arranged in a matrix shape from one another.

Furthermore, the insulating material layer formed on the first substrate 1510 may include a gate insulating layer 1568, an interlayer insulating layer, and/or an insulating structure 1570.

At least one conductive material layer and at least one insulating material layer may be appropriately arranged in each of the unit cells 1490 of the first substrate 1510 so that the respective cells 1490 can be driven independently.

For brevity, FIG. 15 shows an example in which only one TFT is disposed on the first substrate 1510, and one TFT occupies one cell 1490. However, it may become apparent to those of ordinary skill in the art that a plurality of TFTs may be appropriately arranged to enable appropriate driving operations.

The spreading electrodes 1550 may be disposed in an alternating arrangement with respect to the collecting electrodes 1540, and light-controlling particles may be dispersed between the first substrate 1510 and the second substrate 1520. A correlation between each of components and the light-controlling particles is the same as described with reference to FIGS. 5 and 6.

Figure 16:
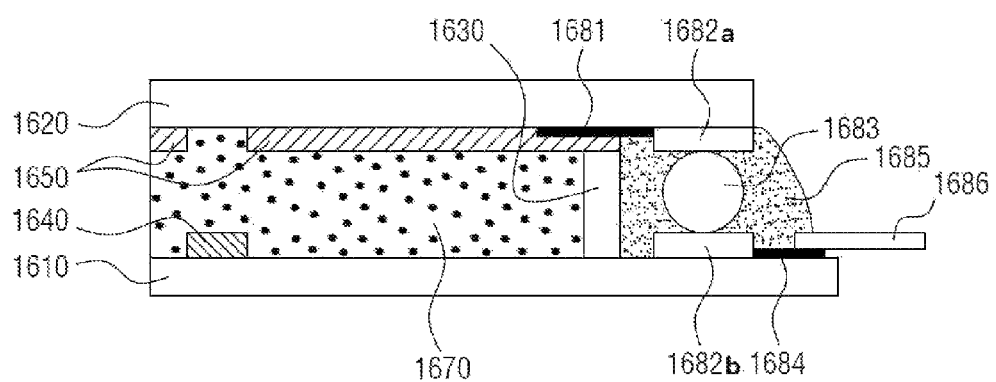
FIG. 16 is a cross-sectional view of lines of a light-controlling device according to an exemplary embodiment of the present invention.

FIG. 16 is a cross-sectional view of a light-controlling device according to an exemplary embodiment of the present invention.

FIG. 16 illustrates lines and a driver configured to drive the light-controlling device. In FIG. 16, the light-controlling device may include a light-shielding region and a peripheral region. The light-shielding region may be a region of the light-controlling device in which light is controlled. The light-shielding region may include a collecting electrodes 1640, a spreading electrodes 1650, and an optical medium layer 1670 containing light-controlling particles, and be referred to as a light-controlling region. The peripheral region may include a portion of the light-controlling device except the light-shielding region. The light-shielding region may discharge a plurality of lines to the peripheral region, and the discharged lines may be connected to the driver through the peripheral region. Although not shown in FIG. 16, the light-shielding region may include a larger number of lines than shown.

FIG. 16 is a cross-sectional view of a light-controlling device in which an electrode is formed on an upper plate of a light-shielding region and connected using a line. In FIG. 16, the light-controlling device may include a collecting electrodes 1640 formed on a first substrate 1610, a second substrate 1620 formed opposite the first substrate 1610, and a spreading electrodes 1650 formed to be in an alternating arrangement with respect to the collecting electrodes 1640. A partition wall 1630 may be formed between the first substrate 1610 and the second substrate 1620.

The spreading electrodes 1650 formed on the second substrate 1620 may be electrically connected to a first line 1681 at the end of a light-shielding region, and the first line 1681 may be electrically connected to a pad 1682*a*. Pads 1682*a* and 1682*b* may be conductive pads formed on the first and second substrates 1610 and 1620. The pads 1682*a* and 1682*b* may be electrically connected using a ball 1683, and the pad 1682*b* disposed on the first substrate 1610 may be electrically connected to a second line 1684. The pads 1682*a* and 1682*b* may be conductive layers configured to fix the ball 1683, and electrically connected to the ball 1683. Also, the ball 1683 may be referred to as a solder ball or a conductive ball. When the first substrate 1610 and the second substrate 1620 are combined, the first and second substrates 1610 and 1620 may be electrically connected and fixed using the pads 1682*a* and 1682*b*. The second line 1684 may be electrically connected to a driver 1686. A sealant may be formed between the first and second substrates 1610 and 1620. The sealant 1685 may adhere to the first and second substrates 1610 and 1620 to each other and prevent fluid from leaking out.

FIG. 16 illustrates a construction in which the spreading electrodes 1650 is electrically connected to the pad 1682*a* using the first line 1681, and the pad 1682*b* is electrically connected to the driver 1686 using the second line 1684, but the present invention is not limited thereto. That is, the second line 1684 may not be disposed, and the spreading electrodes 1650 may expand out of the partition wall 163 and be directly connected to the pad 1682*a*. Alternatively, the pad 1682*b* may extend and be directly electrically connected to the driver 1686 without using lines.

Figure 17:
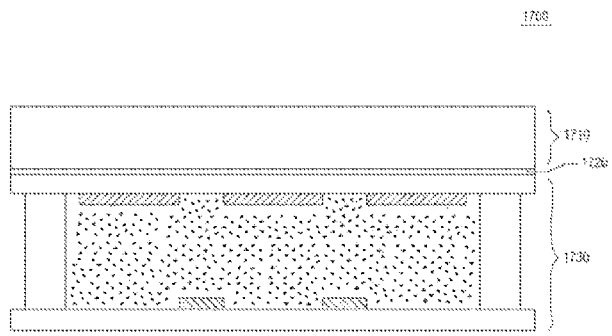
FIG. 17 is a schematic view of a display device to which a light-controlling device according to the respective exemplary embodiments of the present invention.

FIG. 17 is a schematic diagram of a display device 1700 to which a light-controlling device according to various exemplary embodiments of the present invention may be applied. The display device 1700 may include a transparent organic light-emitting diode (OLED) display device 1710, an adhesive layer 1720, and a light-controlling device 1730.

The transparent OLED display device 1710 may include both a top-emission-type OLED display device and a bottom-emission-type OLED display device.

The top-emission-type OLED display may be an OLED display device in which light is emitted by an OLED through an upper portion of the OLED display device. Here, the top-emission type may be referred to as a front-emission type or a top-emission type. In the present specification, the bottom-emission-type OLED display device may be an OLED display device in which light is emitted by an OLED through a lower portion of the OLED display device. Here, the bottom-emission type may be referred to as a back-emission type, a rear-emission type, or a bottom-emission type. In the present specification, a dual-emission-type OLED display device may be an OLED display device in which light is emitted by an OLED through upper and lower portions of the OLED display device. The dual-emission-type OLED display device may refer to an OLED display device that may be driven using both a top-emission method and a bottom-emission method.

The OLED display device may include a substrate, a plurality of TFTs, and an OLED including an anode, an organic emission layer (EML), and a cathode.

The OLED display device may include the TFTs so that the organic EML can emit light. For example, the TFTs may include switching TFTs and driver TFTs. When a scan signal is applied from a gate line, a switching TFT may transmit a data signal received from a data line to a gate electrode of a driver TFT. The driver TFT may supply current received through a power line to the anode in response to the data signal received from the switching TFT, and control an emission operation of an organic EML of the corresponding pixel or sub-pixel in response to the current supplied to the anode.

In FIG. 17, the OLED display device may be a transparent OLED display device 1710. To ensure transmittance of the transparent OLED display device 1710, a substrate, an anode, and a cathode may be formed of a light-transmissive material.

Furthermore, the transparent OLED display device 1710 may include an emission unit configured to emit display light, and a transmission unit configured to transmit incident light. In the emission unit, an anode, an OLED, and a cathode may be stacked so that the OLED can emit light. Each of the anode and the cathode may be formed of a light-transmissive material to enable a dual emission operation. Although FIG. 17 illustrates the transmission unit in which the anode, the OLED, and the cathode are not stacked, the transmission unit may include a structure in which one or two of the anode, the OLED, and the cathode are stacked. FIG. 17 illustrates a transparent OLED display device 1710 that does not include the transmission unit.

Since the light-controlling device of FIG. 17 may be the light-controlling device according to one of the above-described embodiments or another embodiment, a repeated description thereof is omitted.

The light-controlling device 1730 may be adhered to the transparent OLED display device 1710. For instance, the transparent OLED display device 1710 may be disposed on the light-controlling device 1730 using a transparent adhesive or a transparent adhesive layer 1720.

FIG. 17 illustrates an example in which the light-controlling device 1730 is disposed at a bottom end of the transparent OLED display device 1710, but the light-controlling device 1730 may be formed on the transparent OLED display device 1710.

When the light-controlling device 1730 is adhered to the transparent OLED display device 1710, the light-controlling device 1730 may be controlled to shield light so that the transparent OLED display device 1710 may increase a contrast ratio during an emission operation. Also, the light-controlling device 1730 may operate in a transparent mode during an off operation of the transparent OLED display device 1710 so that an object disposed behind the transparent OLED display device 1710 may be seen.

A light-controlling device according to various exemplary embodiments of the present invention may be used for various applications. For example, the light-controlling device may be used for various display devices, for example, not only an OLED display device but also a liquid crystal display (LCD).

In addition, respective features according to embodiments of the present invention may be partially or wholly coupled or combined with each other, and variously interlocked and driven as fully understood by those of ordinary skill in the art.

When a light-controlling device according to various exemplary embodiments of the present invention is adhered to a display device, the design of the light-controlling device may be partially modified according to the kind of the display device. For example, when the display device is a flexible display device, the display device should be capable of being repetitively bent or folded. Thus, various elements included in the light-controlling device may be configured to for greater flexibility.

When a light-controlling device according to various exemplary embodiments of the present invention is adhered to a display device and used, the design of the light-controlling device may be partially modified in consideration of articles at which the display device is installed. For example, when the display device is installed at a small-sized device or mobile device, such as a smartphone, a portable phone, a tablet PC, or personal digital assistant (PDA), since the display device may use a self-battery without external power supply, elements of a light-controlling device may be designed to be fit for a limited battery capacity. Furthermore, when the display device is adhered to and installed at a large-sized device or fixing device, such as a television, a monitor, a screen, or an electric bulletin board, since external power is stably supplied, elements of a light-controlling device may be designed so that the display device can embody high resolution.

When a light-controlling device according to various exemplary embodiments of the present invention is used for a smart window, the light-controlling device may include at least a support used for the smart window. The support may include any kind of film or layer (e.g., a film, a protection layer, or a protection film) that may be used for the smart window.

In addition, the design of the light-controlling device may be partially modified according to a position in which the smart phone is installed. For example, when the light-controlling device is installed in a humid position, such as a restroom, a washbowl, a shower room, or a kitchen, the light-controlling device may be designed to include damp-proof elements.

Furthermore, when the smart window is installed in a position (e.g., a building outer wall, a building glass, or vehicle glass) that may be easily exposed to external shocks, the light-controlling device may be designed to include elements that may easily absorb shock or be highly resistant to shocks.

Also, when the light-controlling device is used for the smart window, various optical films capable of enhancing optical and/or physical properties may be adhered to the light-controlling device. A reflection film, a diffusion film, a prism film, a lens-pattern composite film, a dual-luminance enhancing film, an anti-reflection coating film, an ultraviolet (UV) blocking film, or an infrared (IR) blocking film may be adhered to the light-controlling device to enhance optical and/or physical properties. Based on the enhanced properties, a smart window to which the light-controlling device is adhered may be used as an automobile window, a smart door, a projection wall, or a smart mirror.

When a light-controlling device according to various exemplary embodiments of the present invention is used for a smart window, a house door, or a refrigerator door, the light-controlling device may include an optical sensor.

When a light-controlling device according to various exemplary embodiments of the present invention is used as a light-controlling device having a rectangular shape, a regular tetragonal shape, a polygonal shape, a streamline shape, a circular shape, or various designs, the light-controlling device may be cut into the above-described various shapes, and lines and driver devices may be set to be fit for the various shapes.

Figure 18:
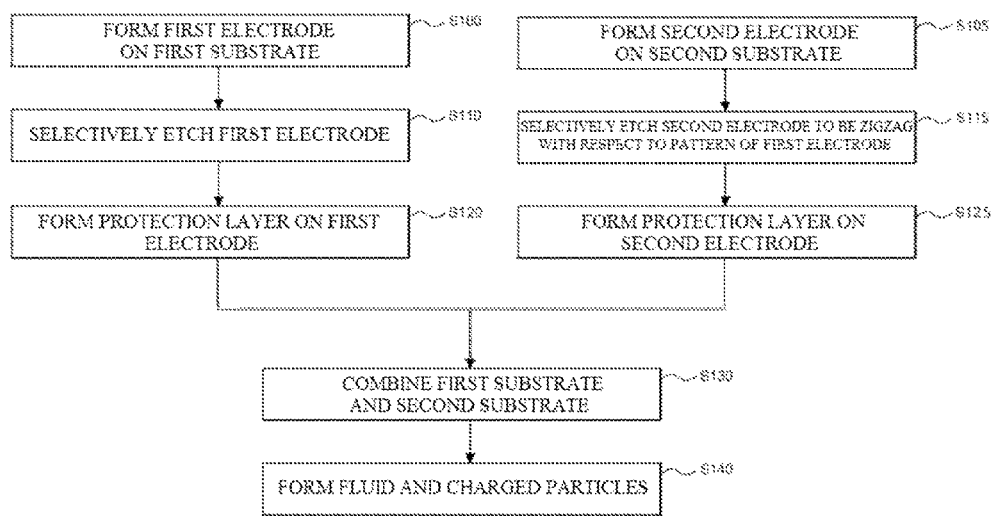
FIG. 18 is a flowchart illustrating a method of manufacturing a light-controlling device according to an exemplary embodiment of the present invention.

FIG. 18 is a flowchart illustrating a method of manufacturing a light-controlling device according to an exemplary embodiment of the present invention. To begin with, collecting electrodes may be formed on a first substrate (operation S100). The collecting electrodes may be selectively etched (operation S110), and a protection layer may be formed on the collecting electrodes (operation S120).

An electrode may be formed on a second substrate (operation S105). Also, the electrode may be selectively etched to form a plurality of spreading electrodes in an alternating fashion with respect to a pattern of the collecting electrodes (operation S115), and a protection layer may be formed on the spreading electrodes (operation S125). The first substrate and the second substrate may be combined with each other with partition walls therebetween (operation S130). After combining the first and second substrates, a fluid and light-controlling particles may be injected between the first and second substrates using a capillary phenomenon (operation S140). The fluid and the light-controlling particles may be injected in a vacuum exhaust state through an injection port of the light-controlling device using the capillary phenomenon.

Figure 19:
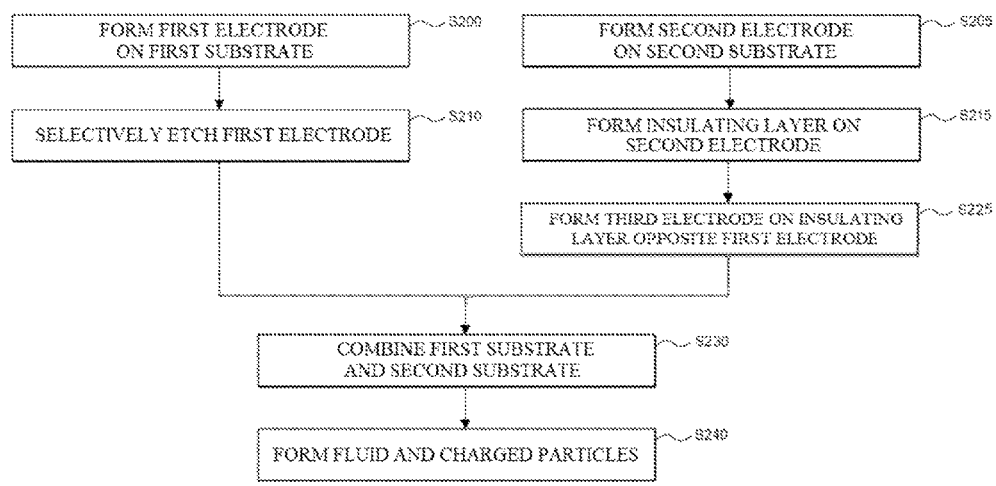
FIG. 19 is a flowchart illustrating a method of manufacturing a light-controlling device according to an exemplary embodiment of the present invention.

FIG. 19 is a flowchart illustrating a method of manufacturing a light-controlling device according to another exemplary embodiment of the present invention. To begin with, a collecting electrodes may be formed on a first substrate (operation S200), and selectively etched (operation S210). Although omitted in FIG. 19, a protection layer may be formed on the collecting electrodes as shown in FIG. 18.

A spreading electrode may be formed on a second substrate (operation S205). An insulating layer may be formed on the spreading electrodes (operation S215), and a third electrode may be formed on the insulating layer opposite the collecting electrodes (operation S225). That is, due to the insulating layer formed on the spreading electrode, the spreading electrode and the third electrode may not be electrically connected to each other but be independently driven. Although omitted in FIG. 19, a protection layer may also be formed on the third electrode.

The first and second substrates may be combined with each other with partition walls therebetween (operation S230). After combining the first and second substrates, a fluid and light-controlling particles may be injected between the first and second substrates (operation S240).

According to the above-described embodiments of the present invention, at least the following effects may be obtained.

The present invention can provide a light-controlling device using light-controlling particles and a method of manufacturing the same, which may efficiently control movement of light-controlling particles and maximize transmittance.

In addition, the present invention can provide a light-controlling device using light-controlling particles and a method of manufacturing the same, which can control movement of light-controlling particles more efficiently and maximize a shielding rate.

Furthermore, a light-controlling device using light-controlling particles can control movement of light-controlling particles more efficiently and improve driving speed.

Also, when a light-controlling device having high transmittance is applied to one surface of a display device, the display device can have a typical display function, and an object disposed on an opposite surface of the light-controlling device can be visible.

In addition, a light-controlling device according to an exemplary embodiment of the present invention can be applied to multifunctional panels, doors, and interior building materials. Furthermore, a light-controlling device according to an exemplary embodiment of the present invention can have a rectangular shape, a regular tetragonal shape, a polygonal shape, a streamline shape, a circular shape, or various designs. The effects according to the present invention are not limited by the above-described examples, and more various effects are included in the present specification.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A light-controlling device, comprising:
a first substrate and a second substrate;
an optical medium containing charged particles between the first and second substrates, wherein the optical medium is formed of a liquid solvent;
a plurality of collecting electrodes each having a first width and a first thickness, the collecting electrodes being disposed on the first substrate, wherein:
the plurality of collecting electrodes are covered with an insulation layer to prevent the charged particles from directly contacting the collecting electrodes, and
wherein the plurality of collecting electrodes include a plurality of projections and depressions; and
a plurality of spreading electrodes each having a second width and a second thickness, the spreading electrodes being disposed on the second substrate at an interval forming an open region having a third width between two adjacent spreading electrodes, wherein:
the first and second substrates are transparent;
the plurality of spreading electrodes are formed of conductive transparent material;
the plurality of collecting electrodes are positioned to correspond to the open region such that the plurality of spreading electrodes have a staggered arrangement with respect to the plurality of collecting electrodes;
light is transmitted through the first substrate and the second substrate when an electric field is applied such that the charged particles are moved to the plurality of the collecting electrodes; and
the light is shielded when the electric field is applied such that the charged particles are distributed over the plurality of the spreading electrodes.

2. The light-controlling device of claim 1, wherein the plurality of collecting electrodes are formed of transparent conductive material.

3. The light-controlling device of claim 2, further comprising a particle guidance member on the first substrate having a third thickness greater than the first thickness with openings at each of the plurality of collecting electrodes.

4. The light-controlling device of claim 3, wherein each of the plurality of collecting electrodes is positioned at a center of the open region.

5. The light-controlling device of claim 4, wherein each of the plurality of collecting electrodes is off-centered from a center of the open region.

6. The light-controlling device of claim 4, wherein the second width is greater than the first width.

7. The light-controlling device of claim 6, the first width is greater than the third width.

8. The light-controlling device of claim 6, wherein the third width is greater than the first width.

9. A light-controlling device comprising
a first substrate and a second substrate;
an optical medium containing charged particles between the first and second substrates;
a plurality of collecting electrodes on the first substrate;
a plurality of spreading electrodes on the second substrate at an interval forming an open region between two adjacent spreading electrodes, wherein the plurality of collecting electrodes are positioned to correspond to the open region such that the plurality of spreading electrodes have a staggered arrangement with respect to the plurality of collecting electrodes; and
a driver electrically connected to the plurality of collecting electrodes and configured to operate the light-controlling device in a transparent mode and a light shielding mode.

10. The apparatus of claim 8, further comprising a transparent display device adhered to one of the first substrate and the second substrate by an adhesive layer, and wherein the driver is further configured to control contrast ratio of the transparent display device.

11. The apparatus of claim 9, wherein the transparent display device is an organic light-emitting diode display device.

12. The apparatus of claim 10, wherein the transparent organic light-emitting diode display is one of top-emission type, bottom-emission type, and dual-emission type.

13. A light-controlling device, comprising:
a first substrate and a second substrate;
an optical medium containing charged particles between the first and second substrates;
a plurality of collecting electrodes on the first substrate;
a first insulation layer arranged to cover the plurality of collecting electrodes to prevent the charged particles from directly contacting the collecting electrodes;
a plurality of spreading electrodes disposed on the second substrate at an interval forming an open region between two adjacent spreading electrodes; and
a second insulation layer arranged to cover the plurality of collecting electrodes to prevent the charged particles from directly contacting the spreading electrodes, wherein:
the first substrate, the second substrate and the plurality of spreading electrodes are transparent, and
the plurality of collecting electrodes are positioned to correspond to the open region such that the plurality of spreading electrodes have a staggered arrangement with respect to the plurality of collecting electrodes.

14. The light-controlling device of claim 12, wherein the insulation layer is configured to prevent direct contact of the charged particles and the collecting and spreading electrodes so that charges of the charged particles are maintained and reliability of the light-controlling device is ensured.

15. The light-controlling device of claim 13, further comprising an insulating structure on the first substrate to guide the charged particles to the collecting electrodes, the insulating structure forms hollow space where the collecting electrodes are disposed therein.

16. The light-controlling device of claim 14, further comprising a driver electrically connected to the plurality of collecting electrodes and configured to operate the light-controlling device in a transparent mode and a light shielding mode, wherein:
   the charged particles are moved to the plurality of the collecting electrodes in the transparent mode, and
   the charged particles are distributed over the plurality of the spreading electrodes in the light shielding mode.

17. The light-controlling device of claim 15, a surface of the collecting electrode includes a buckling structure.

18. The light-controlling device of claim 16, wherein the charged particles include one of light-reflecting particles and white light-controlling particles.

19. The light-controlling device of claim 17, a width of the collecting electrode is within a range of about 1 μm and about 10 μm.

20. The light-controlling device of claim 18, wherein the optical medium is liquid optical medium and the charged particles form about 0.1% to about 10% by weight, based on the total weight of the liquid optical medium.

* * * * *